US010922548B1

(12) United States Patent
Huang et al.

(10) Patent No.: US 10,922,548 B1
(45) Date of Patent: Feb. 16, 2021

(54) SYSTEMS AND METHODS FOR AUTOMATED VIDEO CLASSIFICATION

(71) Applicant: Facebook, Inc., Menlo Park, CA (US)

(72) Inventors: Lei Huang, Fremont, CA (US); Jianyu Wang, Mountain View, CA (US); Guangshuo Liu, Sunnyvale, CA (US); Renbin Peng, Fremont, CA (US); Ziheng Wang, San Jose, CA (US); Raghu Prasad Chalasani, San Jose, CA (US)

(73) Assignee: Facebook, Inc., Menlo Park, CA (US)

( * ) Notice: Subject to any disclaimer, the term of this patent is extended or adjusted under 35 U.S.C. 154(b) by 51 days.

(21) Appl. No.: 16/234,387

(22) Filed: Dec. 27, 2018

(51) Int. Cl.
*G06K 9/62* (2006.01)
*G06K 9/00* (2006.01)
*G06K 9/46* (2006.01)

(52) U.S. Cl.
CPC ....... *G06K 9/00718* (2013.01); *G06K 9/4652* (2013.01)

(58) Field of Classification Search
CPC .......................... G06K 9/00718; G06K 9/4652
See application file for complete search history.

(56) References Cited

U.S. PATENT DOCUMENTS

| | | | | |
|---|---|---|---|---|
| 8,676,030 B2* | 3/2014 | Rakib | ................. | G06F 16/7847 386/248 |
| 9,253,551 B1* | 2/2016 | Lewis | ................. | H04N 21/4758 |
| 9,967,321 B2 | 5/2018 | Sandell et al. | | |
| 10,102,224 B2* | 10/2018 | McKenzie | .......... | G06F 16/5866 |
| 10,235,025 B2* | 3/2019 | Falaki | ..................... | G06F 13/00 |
| 10,394,953 B2 | 8/2019 | Satyavarta et al. | | |
| 10,614,539 B2 | 4/2020 | Pavetic et al. | | |
| 2009/0103886 A1 | 4/2009 | Kataoka | | |
| 2009/0153735 A1 | 6/2009 | Kondo et al. | | |
| 2010/0023961 A1 | 1/2010 | Kim | | |
| 2011/0081075 A1 | 4/2011 | Adcock et al. | | |
| 2013/0215959 A1 | 8/2013 | Chen et al. | | |
| 2014/0313330 A1 | 10/2014 | Carey | | |
| 2014/0362240 A1 | 12/2014 | Klivington et al. | | |

(Continued)

FOREIGN PATENT DOCUMENTS

| | | |
|---|---|---|
| EP | 3518145 | 7/2019 |
| WO | 2018028583 | 2/2018 |
| WO | 2018081751 | 5/2018 |

OTHER PUBLICATIONS

Calonder, Michael et al., "BRIEF: Binary Robust Independent Elementary Features," Proceedings of the 11th European Conference on Computer Vision: Part IV (ECCV'10), pp. 778-792, Sep. 2010.

(Continued)

*Primary Examiner* — Gregory M Desire
(74) *Attorney, Agent, or Firm* — Sheppard Mullin Richter & Hampton LLP

(57) ABSTRACT

Systems, methods, and non-transitory computer-readable media can receive a set of video frames associated with a video. A determination can be made that a threshold number of video frames of the set of video frames depict two or more reaction icons of a set of reaction icons. The video can be identified as a poll video based on the determining that the threshold number of video frames of the set of video frames depict two or more reaction icons of the set of reaction icons.

20 Claims, 20 Drawing Sheets

(56) References Cited

U.S. PATENT DOCUMENTS

| | | |
|---|---|---|
| 2015/0326912 A1 | 11/2015 | Casagrande |
| 2016/0026872 A1 | 1/2016 | Kannan et al. |
| 2016/0034786 A1 | 2/2016 | Suri et al. |
| 2016/0117061 A1* | 4/2016 | Hodgart .............. G09G 5/003 |
| | | 715/733 |
| 2017/0147906 A1 | 5/2017 | Shekhar et al. |
| 2017/0255830 A1 | 9/2017 | Chen |
| 2017/0351653 A1* | 12/2017 | Ramlet .............. G06F 40/58 |
| 2018/0068188 A1 | 3/2018 | Peng |
| 2018/0165554 A1 | 6/2018 | Zhang et al. |
| 2019/0138636 A1 | 5/2019 | Sahota et al. |
| 2019/0146636 A1 | 5/2019 | Kremer-Davidson et al. |
| 2019/0206408 A1 | 7/2019 | Qi |
| 2019/0370559 A1 | 12/2019 | Carter et al. |
| 2020/0084485 A1 | 3/2020 | Dunning et al. |

OTHER PUBLICATIONS

International Patent Application No. PCT/US2019/068542, International Search Report and Written Opinion dated Mar. 20, 2020, 13 pages.

Jianyong, Shi, et al., "An Edge-Based Approach for Video Text Extraction", IEEE 2009 International Conference on Computer Technology and Development (ICCTD '09), Piscataway, New Jersey, USA, XP031585259, ISBN: 978-0-7695-3892-1, Nov. 13, 2009 (Nov. 13, 2009), pp. 331-335.

Sano, Shumpei, et al., "Dgree of Loop Asessment in Microvideo", 2014 IEEE International Conference on Image Processing (ICIP), Oct. 27, 2014 (Year: 2014), pp. 5182-5186.

\* cited by examiner

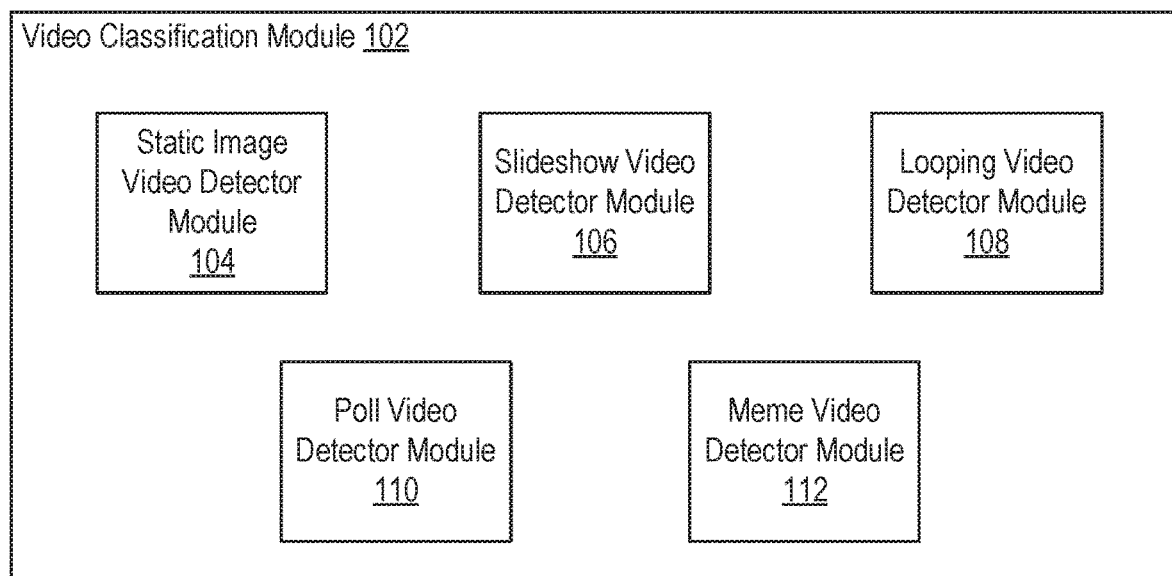
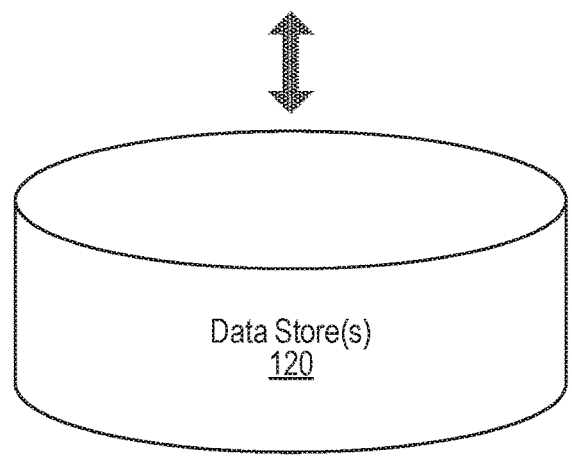
FIGURE 1

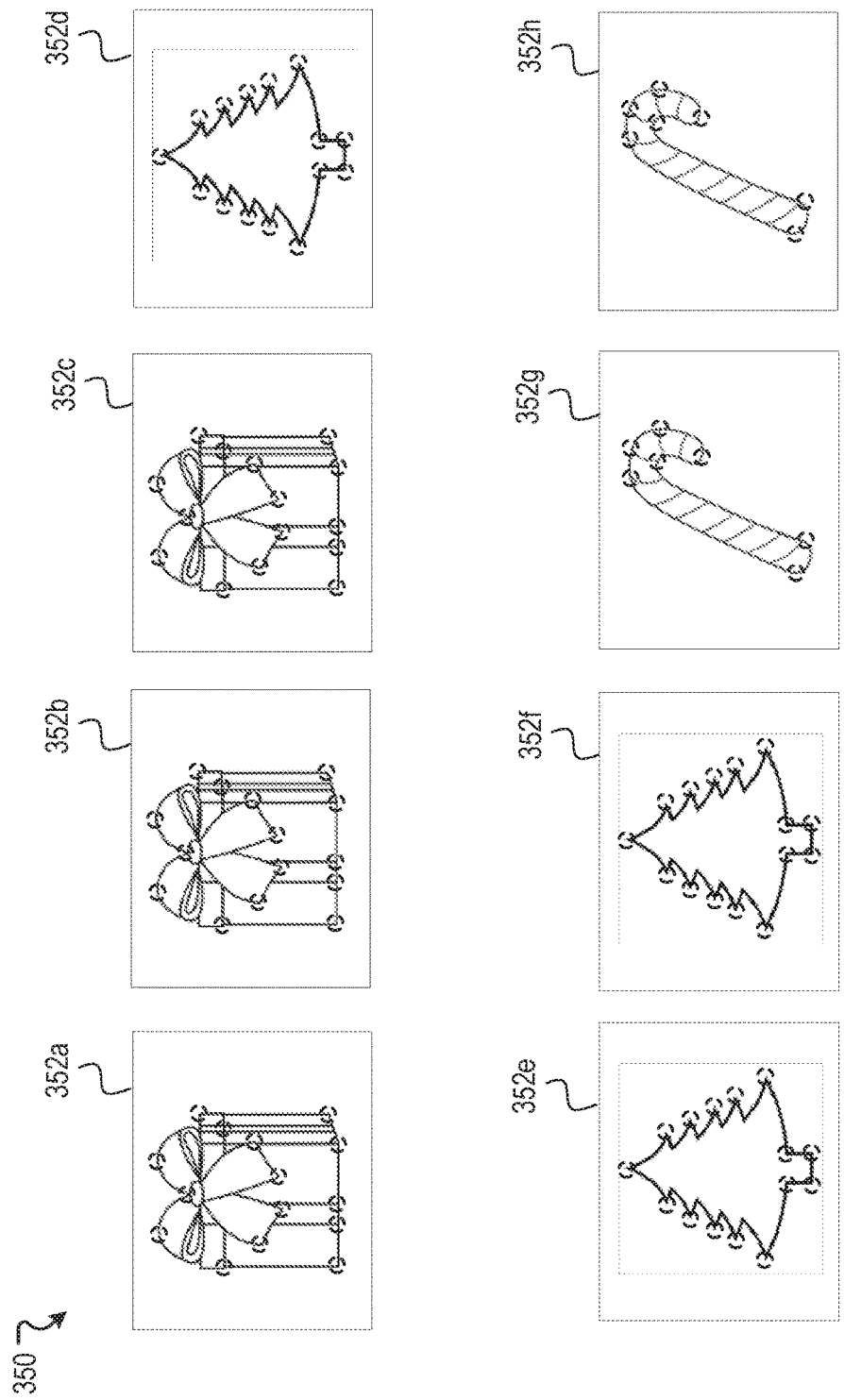

550
552
VOTE: WHAT IS THE BEST GIFT?
VIDEO GAMES
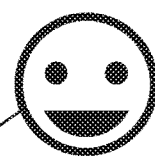
554
520
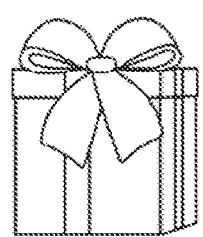
BOARD GAMES
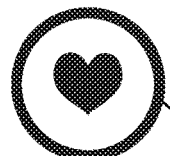
1003
556
554
554
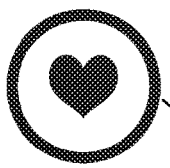
556
FIGURE 5B

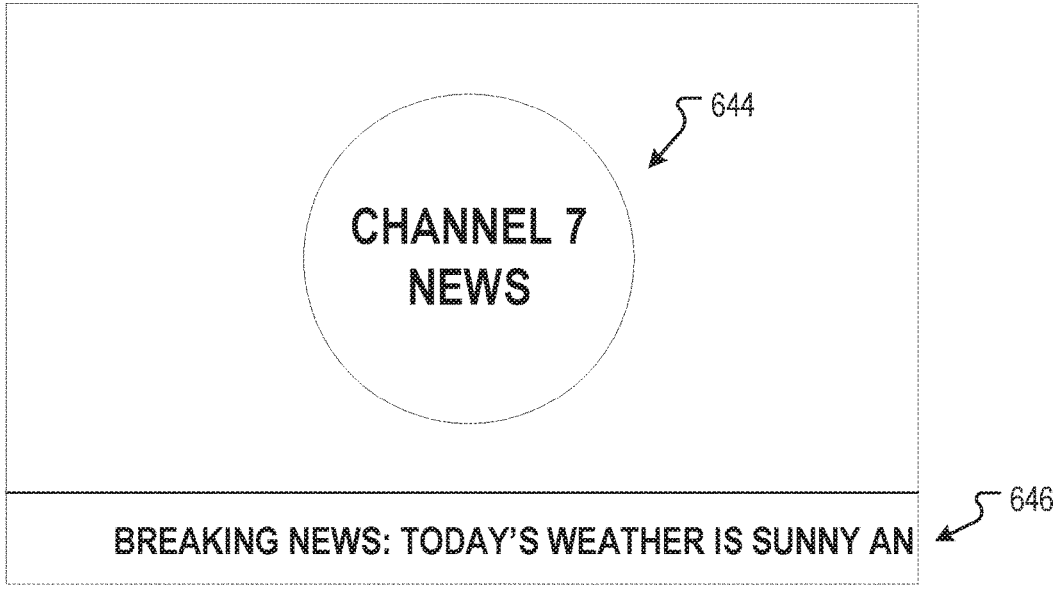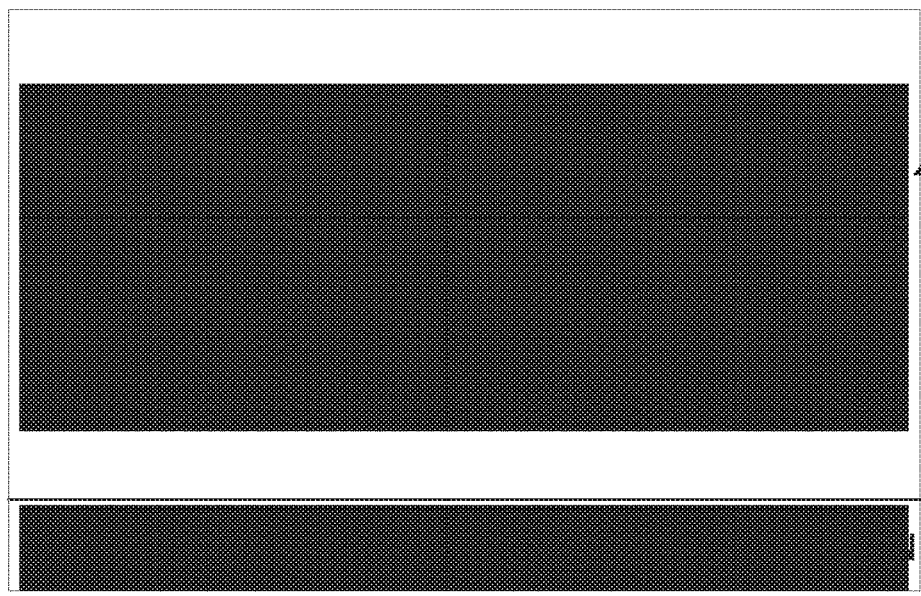
FIGURE 6C

```
800

┌─────────────────────────────────────────────────────────────────┐
  │          Receive a set of video frames associated with a video   │
  │                              802                                 │
  └─────────────────────────────────────────────────────────────────┘
                                   │
                                   ▼
  ┌─────────────────────────────────────────────────────────────────┐
  │ Identify, for each video frame of the set of video frames, a     │
  │ plurality of interest points based on an interest point detector │
  │                              804                                 │
  └─────────────────────────────────────────────────────────────────┘
                                   │
                                   ▼
  ┌─────────────────────────────────────────────────────────────────┐
  │ Determine that a first set of consecutive video frames from the  │
  │ set of video frames depicts a first static image based on the    │
  │ plurality of interest points, the first set of consecutive       │
  │ video frames defining a first suspicious segment                 │
  │                              806                                 │
  └─────────────────────────────────────────────────────────────────┘
                                   │
                                   ▼
  ┌─────────────────────────────────────────────────────────────────┐
  │ Determine that a second set of consecutive video frames from the │
  │ set of video frames depicts a second static image based on the   │
  │ plurality of interest points, the second set of consecutive      │
  │ video frames defining a second suspicious segment                │
  │                              808                                 │
  └─────────────────────────────────────────────────────────────────┘
                                   │
                                   ▼
  ┌─────────────────────────────────────────────────────────────────┐
  │ Identify the video as a slideshow video based on a determination │
  │ that the set of video frames comprises a threshold number of     │
  │ suspicious segments                                              │
  │                              810                                 │
  └─────────────────────────────────────────────────────────────────┘
```

Receive a set of video frames associated with av ideo
902

Determine that a first set of consecutive video frames of the set of video frames depicts identical content to a second set of consecutive video frames of the set of video frames, wherein the first set of consecutive video frames and the second set of consecutive video frames satisfy a threshold number of consecutive video frames
904

Identify the video as a looping video based on the determination that the first set of consecutive video frames depicts identical content to the second set of consecutive video frames
906

FIGURE 9

SYSTEMS AND METHODS FOR AUTOMATED VIDEO CLASSIFICATION

FIELD OF THE INVENTION

The present technology relates to the fields of digital media content and social networking systems. More particularly, the present technology relates to techniques for automated video detection and processing.

BACKGROUND

Today, people often utilize computing devices (or systems) for a wide variety of purposes. Users can use their computing devices to, for example, interact with one another, access content, share content, and create content. In some cases, content items can include postings from members of a social networking system. The postings may include text and media content items, such as images, videos, and audio. The postings may be published to the social networking system for consumption by others.

SUMMARY

Various embodiments of the present technology can include systems, methods, and non-transitory computer readable media configured to receive a set of video frames associated with a video. For each video frame of the set of video frames, a plurality of interest points are identified based on an interest point detector. For each video frame of the set of video frames, it is determined whether the video frame depicts the same static image as a next video frame in the set of video frames based on the plurality of interest points identified in each video frame.

In an embodiment, the determining, for each video frame of the set of video frames, whether the video frame depicts the same static image as a next video frame comprises determining whether the next video frame comprises a threshold number of interest points in common with the video frame.

In an embodiment, the determining, for each video frame of the set of video frames, whether the video frame depicts the same static image as a next video frame further comprises determining whether each interest point in common between the video frame and the next video frame has moved less than a threshold distance from the video frame to the next video frame.

In an embodiment, the video is identified as a static image video based on a determination that a threshold number of video frames from the set of video frames depict the same static image.

In an embodiment, the video is downranked in a content ranking system based on the identifying the video as a static image video.

In an embodiment, the video comprises a plurality of video frames, and the set of video frames comprises a sampled subset of the plurality of video frames.

In an embodiment, the video comprises a static image and one or more semi-transparent moving objects overlaid on the static image.

In an embodiment, the determining, for each video frame of the set of video frames, whether the video frame depicts the same static image as a next video frame comprises: determining that a first set of consecutive video frames from the set of video frames depicts a first static image, and determining that a second set of consecutive video frames from the set of video frames depicts a second static image.

In an embodiment, the first set of consecutive video frames is identified as a first suspicious segment based on a determination that the first set of consecutive video frames comprises at least a threshold number of consecutive frames, and the second set of consecutive video frames is identified as a second suspicious segment based on a determination that the second set of consecutive video frames comprises at least a threshold number of consecutive video frames.

In an embodiment, the video is identified as a slideshow video based on a determination that the set of video frames comprises a threshold number of suspicious segments.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

Various embodiments of the present technology can include systems, methods, and non-transitory computer readable media configured to receive a set of video frames associated with a video. A determination can be made that a first set of consecutive video frames of the set of video frames depicts identical content to a second set of consecutive video frames of the set of video frames, wherein the first set of consecutive video frames and the second set of consecutive video frames satisfy a threshold number of consecutive video frames. The video is identified as a looping video based on the determination that the first set of consecutive video frames depicts identical content to the second set of consecutive video frames.

In an embodiment, the determining that the first set of consecutive video frames of the set of video frames depicts identical content to the second set of consecutive video frames of the set of video frames comprises: determining a first comparison video frame in the set of video frames, the first comparison video frame defining a starting video frame for the second set of consecutive video frames; identifying a first matching video frame of the set of video frames that depicts identical content to the first comparison video frame; and determining that a threshold number of consecutive video frames occurring consecutively after the first matching video frame depict identical content to a set of consecutive video frames occurring consecutively after the first comparison video frame.

In an embodiment, the first comparison video frame is a first video frame of the video.

In an embodiment, the first comparison video frame is a first video frame occurring after a pre-determined period of time after the start of the video.

In an embodiment, for each video frame of the set of video frames, a downsampled video frame is generated to define a set of downsampled video frames.

In an embodiment, the generating, for each video frame of the set of video frames, a downsampled video frame comprises collecting a pre-defined subset of pixels at one or more fixed positions from each video frame of the set of video frames.

In an embodiment, the determining that the first set of consecutive video frames of the set of video frames depicts identical content to the second set of consecutive video frames of the set of video frames is performed based on the set of downsampled video frames.

In an embodiment, the video is a live streaming video.

In an embodiment, the live video is terminated based on the identifying the video as a looping video.

In an embodiment, the determining that the first set of consecutive video frames of the set of video frames depicts identical content to the second set of consecutive video frames of the set of video frames is performed based on pixel subtraction.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

Various embodiments of the present technology can include systems, methods, and non-transitory computer readable media configured to receive a set of video frames associated with a video. A determination can be made that a threshold number of video frames of the set of video frames depict two or more reaction icons of a set of reaction icons. The video can be identified as a poll video based on the determining that the threshold number of video frames of the set of video frames depict two or more reaction icons of the set of reaction icons.

In an embodiment, each reaction icon of the set of reaction icons is associated with one or more colors, and the one or more colors associated with each reaction icon collectively define a set of colors associated with the set of reaction icons.

In an embodiment, the determining that the threshold number of video frames of the set of video frames depict two or more reaction icons comprises: filtering each video frame of the set of video frames based on the set of colors to define a set of color-filtered video frames.

In an embodiment, the set of colors associated with the set of reaction icons comprises a plurality of ranges of RGB values.

In an embodiment, the determining that the threshold number of video frames of the set of video frames depict two or more reaction icons further comprises: Identifying any circles depicted in each video frame of the set of video frames.

In an embodiment, the identifying any circles depicted in each video frame of the set of video frames comprises identifying any circles depicted in each video frame of the set of video frames based on Hough transforms.

In an embodiment, the determining that the threshold number of video frames of the set of video frames depict two or more reaction icons further comprises: determining, for each circle identified in the set of video frames, whether the circle depicts a reaction icon of the set of reaction icons.

In an embodiment, the determining, for each circle identified in the set of video frames, whether the circle depicts a reaction icon of the set of reaction icons comprises determining whether the circle depicts a reaction icon of the set of reaction icons based on shape context feature descriptors.

In an embodiment, the set of reaction icons are a set of reaction icons provided by a social networking system for responding to content items posted to the social networking system.

In an embodiment, the video is a video posted to the social networking system.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

Various embodiments of the present technology can include systems, methods, and non-transitory computer readable media configured to receive a set of video frames associated with a video. Dynamic regions in each video frame of the set of video frames can be filtered out, wherein each dynamic region represents a region in which a threshold level of movement is detected. A determination can be made for each video frame of the set of filtered video frames, whether the video frame comprises synthetic overlaid text based on a machine learning model.

In an embodiment, the video is labeled as a meme video based on a determination that a threshold number of frames of the filtered set of video frames comprises synthetic overlaid text.

In an embodiment, the filtering out dynamic regions in each video frame of the set of video frames comprises: for each video frame of a subset of video frames from the set of video frames, comparing the video frame with a next video frame in the subset of video frames, and identifying any pixels that change from the video frame to the next video frame.

In an embodiment, each video frame of the set of video frames comprises a plurality of rows of pixels.

In an embodiment, the filtering out dynamic regions in each video frame of the set of video frames further comprises: for each video frame of a subset of video frames from the set of video frames, comparing the video frame with a next video frame in the subset of video frames, and identifying any rows of the plurality of rows of pixels that change from the video frame to the next video frame; labeling each row that changes in a threshold number of video frames as a dynamic row, and for each row that is identified as a dynamic row, filtering out the dynamic row in each video frame of the set of video frames.

In an embodiment, the filtering out the dynamic row in each video frame of the set of video frames comprises blacking out each row identified as a dynamic row.

In an embodiment, the subset of video frames comprises a fixed number of video frames from a beginning portion of the set of video frames.

In an embodiment, the subset of video frames comprises video frames in the set of video frames that encompass a pre-determined timeframe within the set of video frames.

In an embodiment, a determination is made, for a first user, that the first user has been presented with a threshold number of meme videos. The video is prevented from being presented to the first user based on the determining that the first user has been presented with a threshold number of meme videos.

In an embodiment, the video is downranked in a content ranked system based on the identifying the video as a meme video.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

BRIEF DESCRIPTION OF THE DRAWINGS

FIG. 1 illustrates an example system including a video classification module, according to an embodiment of the present technology.

FIG. 3B illustrates an example scenario associated with slideshow video detection, according to an embodiment of the present technology.

FIG. 5B illustrates an example scenario associated with poll video detection, according to an embodiment of the present technology.

FIGS. 6B-6C illustrate example scenarios associated with meme video detection, according to an embodiment of the present technology.

FIG. 8 illustrates an example method associated with slideshow video detection, according to an embodiment of the present technology.

FIG. 9 illustrates an example method associated with looping video detection, according to an embodiment of the present technology.

Figure 2A:
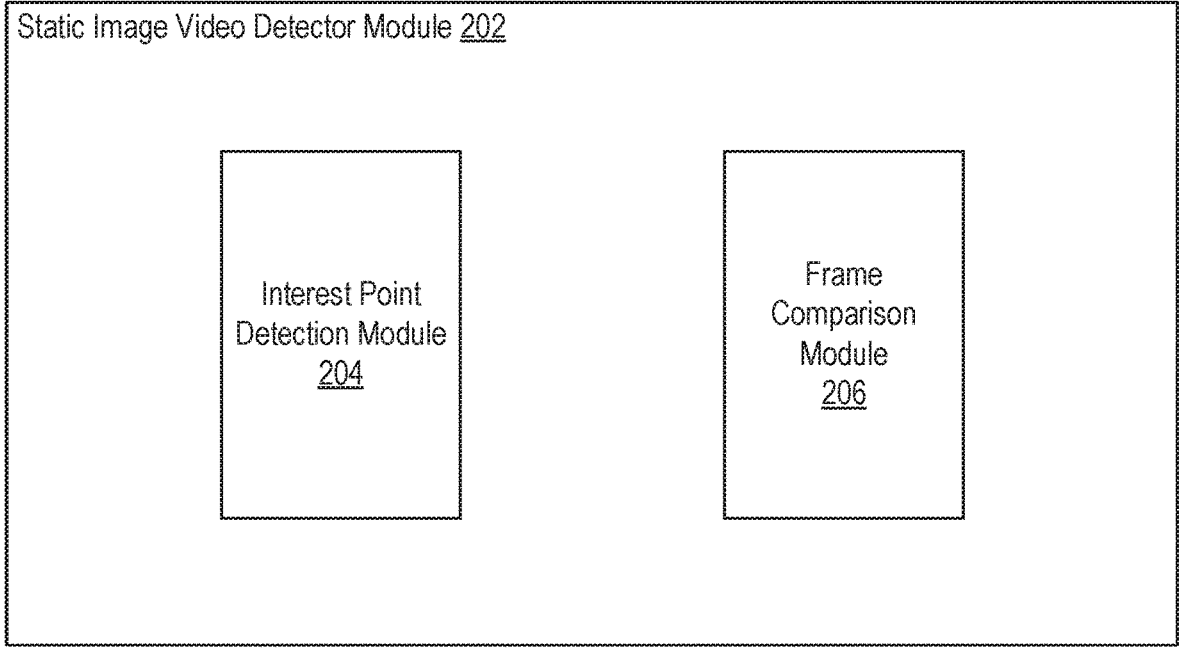
FIG. 2A illustrates a static image video detector module, according to an embodiment of the present technology.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Approaches for Automated Video Classification

People often utilize computing devices (or systems) for a wide variety of purposes. Users can use their computing devices to, for example, interact with one another, access content, share content, and create content. In some cases, content items can include postings from members of a social networking system. The postings may include text and media content items, such as images, videos, and audio. The postings may be published to the social networking system for consumption by others.

When content is posted to a social networking system, that content may be ranked and then presented to users based on the ranking. For example, content may be presented to a user within a newsfeed interface, and content may be ordered within the newsfeed interface based on a ranking. In certain instances, content may be ranked based on user characteristics for a particular user such that content that may be of most interest to the user can be presented to the user. For example, content posted by close friends or family of a user may be given priority (e.g., ranked higher) over content posted by other users with whom the user has no relation. Or in another example, content pertaining to a topic that is of interest to the user may be given priority over content pertaining to a topic that is of little or no interest to the user.

In certain systems, content posted to a social networking system may be automatically ranked according to a ranking algorithm. When content is ranked automatically according to a ranking algorithm, certain users may attempt to trick or manipulate the ranking algorithm so that their posted content is given a higher ranking. For example, a ranking algorithm may give preferential ranking to videos over static images or text-only content posts because videos are generally considered to be more interesting than static images or text-only content posts. However, a user may attempt to manipulate this feature in a ranking algorithm by converting a static image or a text-only content post into a video, and posting the video so that the content post will be ranked as if it was a video even though it displays only a static image or text. In another example, a ranking algorithm may be configured to give favorable rankings to live streaming videos over other types of content (e.g., pre-recorded video, static image, text-only content post). A user may attempt to manipulate such a feature in a ranking algorithm by posting a pre-recorded video, static image, or text-only content post as a live streaming video. Conventional approaches may not be effective in addressing such attempts to manipulate a content ranking algorithm.

Furthermore, consistent with the interest of a social networking system to provide users with content that users may find interesting, a social networking system may have a related interest in ensuring that content being presented to users is diverse in nature. For example, users may find memes and other viral content interesting and/or humorous. However, users may nonetheless find it tiresome if their newsfeeds are filled with only viral content such that they are never presented with any non-viral content posted by their close family and friends. In order to maintain diversity of content in user newsfeeds, a social networking system may have an interest in being able to identify and distinguish between different types of content at varying levels of granularity. However, conventional approaches may not provide adequate tools for being able to distinguish and identify content in this manner. Conventional approaches may not be effective in addressing these and other problems arising in computer technology.

An improved approach rooted in computer technology overcomes the foregoing and other disadvantages associated with conventional approaches specifically arising in the realm of computer technology. In general, various methodologies may be employed to automatically identify videos of various types (or classifications), such that appropriate action can be taken with respect to those videos. For example, in one embodiment, videos that present only one or more static images may be automatically identified. In one embodiment, videos that present looping (or repeating) content may be automatically identified. In an embodiment, videos that attempt to use user engagement features (such as likes, reaction icons, comments) to poll users can be automatically identified. In an embodiment, videos that are memes may be automatically identified. Many variations are possible. More details relating to the disclosed technology are provided below.

FIG. 1 illustrates an example system 100 including a video classification module 102, according to an embodiment of the present technology. The video classification module 102 can be configured to identify videos of various types or classifications, such as static image videos, slideshow videos, looping videos, poll videos, and/or meme videos, as will be described in greater detail herein. As shown in the example of FIG. 1, the video classification module 102 can include a static image video detector module 104, a slideshow video detector module 106, a looping video detector module 108, a poll video detector module 110, and a meme video detector module 112. In some instances, the example system 100 can include at least one data store 120. The components (e.g., modules, elements, etc.) shown in this figure and all figures herein are exemplary only, and other implementations may include additional, fewer, integrated, or different components. Some components may not be shown so as not to obscure relevant details. In various embodiments, one or more of the functionalities described in connection with the video classification module 102 can be implemented in any suitable combinations.

In some embodiments, the video classification module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the video classification module 102 can be, in part or in whole, implemented as software running on one or more computing devices or systems, such as on a server system or a client computing device. In some instances, the video classification module 102 can be, in part or in whole, implemented within or configured to operate in conjunction with or be integrated with a social networking system (or service), such as a social networking system 1230 of FIG. 12. Likewise, in some instances, the video classification module 102 can be, in part or in whole, implemented within or configured to operate in conjunction with or be integrated with a client computing device, such as the user device 1210 of FIG. 12. For example, the video classification module 102 can be implemented as or within a dedicated application (e.g., app), a program, or an applet running on a user computing device or client computing system. The application incorporating or implementing instructions for performing functionality of the video classification module 102 can be created by a developer. The application can be provided to or maintained in a repository. In some cases, the application can be uploaded or otherwise transmitted over a network (e.g., Internet) to the repository. For example, a computing system (e.g., server) associated with or under control of the developer of the application can provide or transmit the application to the repository. The repository can include, for example, an "app" store in which the application can be maintained for access or download by a user. In response to a command by the user to download the application, the application can be provided or otherwise transmitted over a network from the repository to a computing device associated with the user. For example, a computing system (e.g., server) associated with or under control of an administrator of the repository can cause or permit the application to be transmitted to the computing device of the user so that the user can install and run the application. The developer of the application and the administrator of the repository can be different entities in some cases, but can be the same entity in other cases. It should be understood that many variations are possible.

The video classification module 102 can be configured to communicate and/or operate with the at least one data store 120, as shown in the example system 100. The data store 120 can be configured to store and maintain various types of data. In some implementations, the data store 120 can store information associated with the social networking system (e.g., the social networking system 1230 of FIG. 12). The information associated with the social networking system can include data about users, user identifiers, social connections, social interactions, profile information, demographic information, locations, geo-fenced areas, maps, places, events, pages, groups, posts, communications, content, feeds, account settings, privacy settings, a social graph, and various other types of data. In some implementations, the data store 120 can store information to be utilized by the video classification module 102. Various examples of information that may be utilized by the video classification module 102 will be described in greater detail herein.

The static image video detector module 104 can be configured to automatically identify videos that present only a static image, i.e., static image videos. As mentioned above, certain automatic content ranking systems or algorithms may give preference to video content over static images or text-only content. Users may attempt to manipulate such ranking systems or algorithms by converting static images or static text into a video, and then publishing the video (e.g., to a social networking system). The static image video detector module 104 automatically identifies static image videos. More details regarding the static image video detector module 104 will be provided below with reference to FIG. 2A.

The slideshow video detector module 106 can be configured to automatically identify videos that present a collection of static images, i.e., slideshow videos. As mentioned above, certain automatic content ranking systems or algorithms may give preference to video content over static images or collections of static images. Users may attempt to manipulate such ranking systems or algorithms by converting a collection of static images into a video, and then publishing the video (e.g., to a social networking system). Furthermore, even if users are not attempting to manipulate a ranking system, and are simply uploading a video of a slideshow, it may be useful for a content publisher (such as a social networking system) to be able to identify slideshow videos to, for example, ensure diversity in user content feeds (e.g., user newsfeeds). The slideshow video detector module 106 automatically identifies slideshow videos. More details regarding the slideshow video detector module 106 will be provided below with reference to FIG. 3A.

The looping video detector module 108 can be configured to automatically identify looping (or repeating) videos. In certain embodiments, an automatic content ranking system or algorithm may give preference to live streaming videos over, for example, pre-recorded video content, static images, and/or text-only content posts. Users may attempt to create fake live streaming videos. For example, they may upload pre-recorded video content with a live streaming feature. For example, a user may initiate a live streaming video, and simply have the live stream broadcast a looping, pre-recorded video clip. The looping video detector module 108 automatically identifies such looping or repeating videos. More details regarding the looping video detector module 108 will be provided below with reference to FIG. 4A.

The poll video detector module 110 can be configured to automatically identify videos that encourage users to vote between two or more options using user engagement features (e.g., reaction icons or comments), i.e., poll videos. For example, a poll video may be a video that asks users a question (e.g., "Do you prefer apples or oranges?") and urges users to vote using various reaction icons (e.g., "Select the 'like' reaction icon for apples, or the 'love' reaction icon for oranges."). Such poll videos may be problematic for various reasons. For example, poll videos may attempt to manipulate automatic content ranking systems or algorithms that give higher preference to content that has large amounts of user engagement. In general, if a content item receives a large amount of user engagement (e.g., likes, reactions, comments), that is an indication that users find the content item to be interesting. However, even though poll videos may acquire large amounts of user engagement because users are submitting votes using user engagement features, the videos may not be particularly interesting to users. Furthermore, it may be desirable to be able to automatically identify such videos so that a content publisher (e.g., a social networking system) can prevent poll videos from being unduly overrepresented in user newsfeeds. The poll video detector module 110 automatically identifies poll videos. More details regarding the poll video detector module 110 will be provided below with reference to FIG. 5A.

The meme video detector module 112 can be configured to automatically identify meme videos. In many instances, meme videos may include a static image or a video that has been overlaid with humorous text. While users may find such meme videos humorous or enjoyable, a content publisher (e.g., a social networking system) may still have an interest in automatically identifying such videos, for example, to prevent meme videos from being unduly overrepresented in user newsfeeds. The meme video detector module 112 automatically identifies meme videos. More details regarding the meme video detector module 112 will be provided below with reference to FIG. 6A.

FIG. 2A illustrates an example static image video detector module 202 according to an embodiment of the present technology. In some embodiments, the static image video detector module 104 of FIG. 1 can be implemented as the static image video detector module 202. As shown in the example of FIG. 2A, the static image video detector module 202 can include an interest point detection module 204 and a frame comparison module 206.

In the simplest static image videos, each video frame in the static image video may depict the same static image and, as such, each video frame will be essentially identical to every other video frame in the static image video. In these simplest instances, a static image video can be identified by comparing each video frame in a video to the next video frame to determine whether they are identical to one another. If all or substantially (e.g., a threshold number of) all video frames in a video are identical, the video can be identified as a static image video. However, certain users may attempt to work around more basic identification systems by placing semi-transparent moving objects within the video. The semi-transparent moving objects allow a user viewing the static image video to see the static image. Video frames within the video are not exactly identical to one another due to the semi-transparent moving objects changing position, orientation, color, brightness, and/or shape from one video frame to the next. The present technology allows for detection of static image videos even if they incorporate such measures to avoid detection.

The interest point detection module 204 can be configured to identify a plurality of interest points in each video frame of a set of video frames. The set of video frames can be associated with a video (e.g., a video posted to a social networking system). In an embodiment, the set of video frames can include all video frames in the video. In another embodiment, the set of video frames can include a set of sampled video frames collected from the video. For example, the set of sampled video frames can be generated by sampling video frames at regular time intervals in a video (e.g., one video frame every half second).

A set of interest points can be identified in each video frame by utilizing an interest point detector. One example of an interest point detector is disclosed in the paper Calonder M., Lepetit V., Strecha C., Fua P. (2010) *BRIEF: Binary Robust Independent Elementary Features*, published in Daniilidis K., Maragos P., Paragios N. (eds) Computer Vision—ECCV 2010. ECCV 2010. Lecture Notes in Computer Science, vol 6314. Springer, Berlin, Heidelberg. An interest point detector may rely on a combination of contrast, changes in color between adjacent pixels, detected corners and/or edges, and the like, to identify interest points in an image, such as a video frame. An interest point detector is unlikely to detect interest points corresponding to any semi-transparent moving objects artificially added to a static image video, as these objects are intentionally made to be substantially transparent so that they do not interfere with a user's ability to view the static image in a static image video. By identifying interest points in each video frame of a set of video frames, interest points in one video frame can be compared to interest points in another video frame to determine whether there is any change in the position and/or number of interest points between the two video frames. If the two video frames depict the same static image (as would be the case in a static image video), the number and position of interest points in the two video frames would be substantially identical (e.g., within a threshold level of difference).

In an embodiment, an interest point detector used to identify interest points in a video frame can also be configured to assign each interest point an interest point signature. Interest point signatures can be unique to an interest point, such that different interest points have different interest point signatures, but if the same interest point is present in multiple video frames, that same interest point will maintain the same interest point signature across the multiple video frames. Such interest point signatures can be used to track the position and/or movement of interest points from one video frame to the next. For example, in a video of a person speaking, a first interest point may be identified on the left eye of the person. In a series of video frames depicting the person speaking, the first interest point would continue to be positioned on the left eye of the speaking person. If the video then changes to another subject (e.g., a dog running), the first interest point and its associated interest point signature would no longer be present in those video frames that depict the running dog rather than the speaking person. As will be described in greater detail below, interest point signatures can be used to determine whether two video frames depict the same interest points, and whether those interest points have changed in position.

The frame comparison module 206 can be configured to identify static image videos by comparing interest points in a set of video frames. In an embodiment, a set of video frames can be ordered in a particular order. For example, the set of video frames may be ordered in the same order as they appear within a video from which the set of video frames was collected. In an embodiment, the frame comparison module 206 can, for each video frame in the set of video frames, compare the interest points identified in the video frame to a set of interest points identified in a next video frame (i.e., the video frame occurring immediately after the video frame in the ordered set of video frames). As discussed above, each interest point may be associated with an interest point signature which uniquely identifies that interest point across one or more video frames. In an embodiment, the interest point signature for each interest point in a video frame can be used to determine whether that interest point is also present in a next video frame, and to determine whether that interest point has changed position from the video frame to the next video frame. In an embodiment, if a threshold number of interest points in a video frame are present in a next video frame, and maintain approximately the same position in the next video frame, it can be determined that the two video frames depict the same image.

In certain instances, a set of video frames may depict a single static image, but may include some minimal level of motion, e.g., zooming in, zooming out, or panning across the static image. As such, rather than determining whether interest points maintain the exact same position from one video frame to the next, the frame comparison module 206 can determine whether a threshold number of interest points are maintained from one video frame to the next, and whether those interest points have changed in position by less than a threshold amount. For example, the frame comparison module 206 can determine whether at least 90% of interest points in a first video frame are also present in a next video frame, and whether those interest points have changed position by less than 10 pixels. If so, the two video frames can be determined to depict the same static image. The frame comparison module 206 can compare each video frame in a set of video frames to the subsequent (i.e., next) video frame to determine whether the two video frames depict the same static image. If a threshold number of video frames in the set of video frames are determined to depict the same static image, a video associated with the set of video frames can be identified as a static image video. Conversely, if a threshold number of video frames in the set of video frames are determined not to depict the same static image, the video associated with the set of video frames can be determined not to be a static image video.

In certain embodiments, various actions may be taken by the frame comparison module 206 in response to determining that a video is a static image video. For example, the static image video may be downranked by a content ranking system or algorithm (e.g., downranked in a user newsfeed content ranking algorithm). Or, in another example, the static image video can be ranked within a content ranking system or algorithm as if it was a static image rather than a video. In yet another example, the static image video can be removed from a content ranking system such that it will not be published or presented to other users (e.g., published or presented to users of a social networking system). In certain embodiments, the number and/or ratio of static image videos presented to a particular user can be monitored such that the user is not presented with greater than a threshold number or threshold ratio of static image videos. Many variations are possible.

Figure 2B:
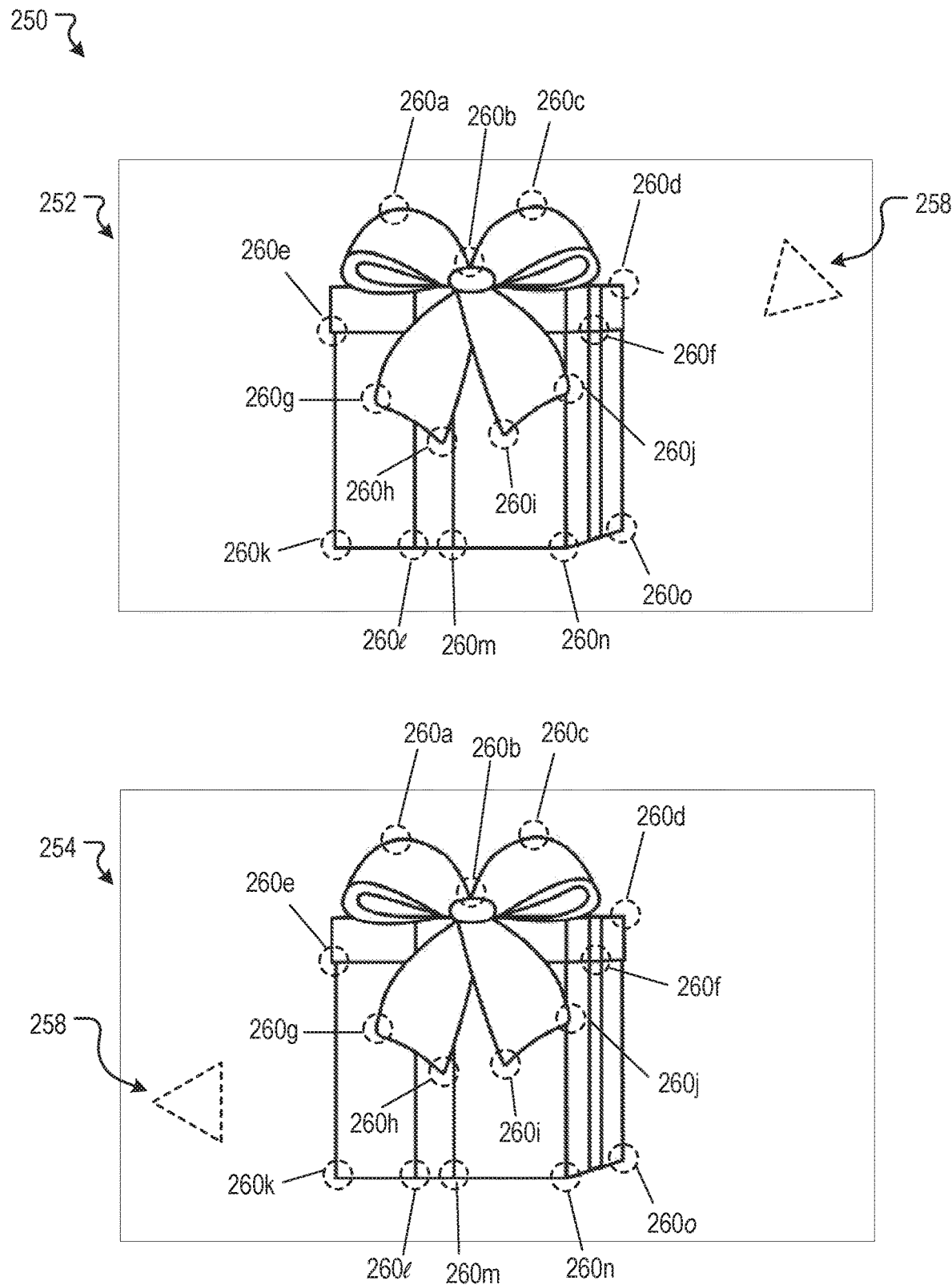
FIG. 2B illustrates an example scenario associated with static image video detection, according to an embodiment of the present technology.

FIG. 2B illustrates an example scenario 250 that illustrates functionality of the static image video detector module 202, according to an embodiment of the present technology. In the example scenario 250, a first video frame 252 from a set of video frames collected from a static image video is depicted on top, and a second video frame 254 from the set of video frames is depicted on the bottom. The static image video depicts a static image of a wrapped gift. The static image video also includes an artificially added semi-transparent moving object in the form of a moving triangle 258. The semi-transparent moving triangle 258 changes orientation and position between the first video frame 252 and the second video frame 254. An interest point detector is used to identify a set of interest points 260a-260o in the first video frame 252. This may be performed, for example, by the interest point detection module 204. Similarly, the interest point detector is used to identify a set of interest points in the second video frame 254. It can be seen that the interest point detector does not cause any interest points to be identified on the semi-transparent moving triangle 258 due at least partially to the fact that it is semi-transparent and lacks contrast. It can also be seen that the two video frames 252, 254 have the identical set of interest points 260a-260o, and none of the interest points 260a-260o have changed position from the first video frame 252 to the second video frame 254. As such, a determination can be made (e.g., by the frame comparison module 206) that the first video frame 252 and the second video frame 254 depict the same static image. The second video frame 254 can then be compared to a third video frame from the set of video frames, and the third video frame can then be compared to a fourth video frame from set of video frames, and so forth, until each video frame in the set of video frames has been compared with a next video frame in the set of video frames. If a threshold number or a threshold percentage of video frames in the set of video frames are determined to depict the same static image, the video can be identified as a static image video.

Figure 3A:
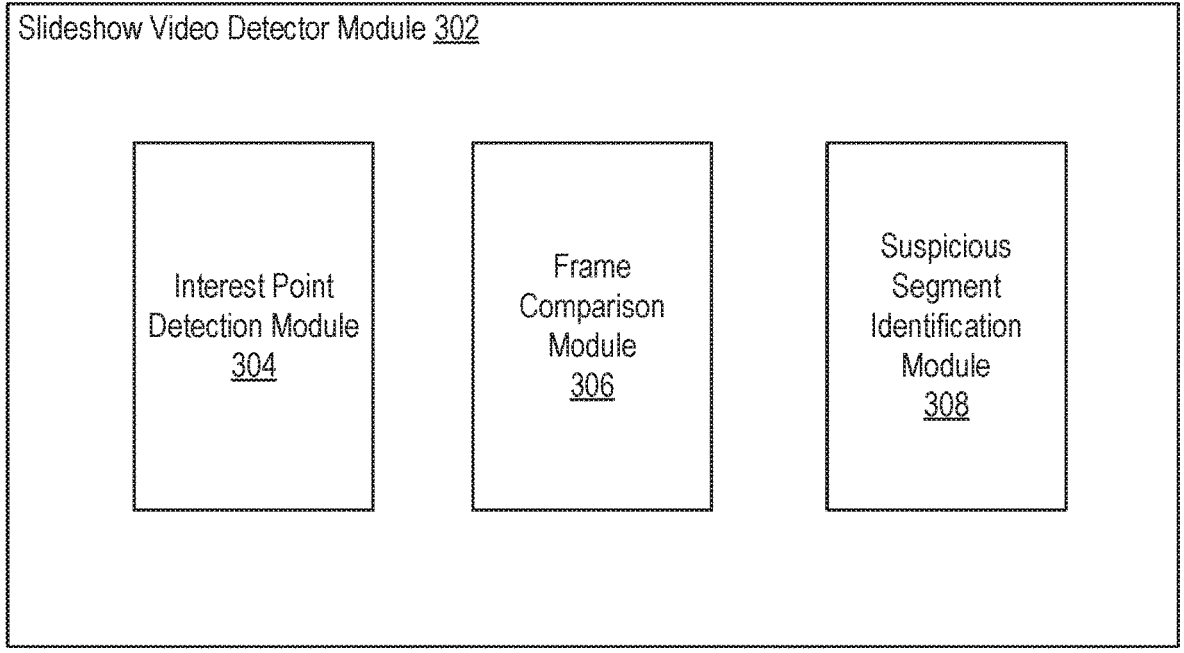
FIG. 3A illustrates a slideshow video detector module, according to an embodiment of the present technology.

FIG. 3A illustrates an example slideshow video detector module 302 according to an embodiment of the present technology. In some embodiments, the slideshow video detector module 106 of FIG. 1 can be implemented as the slideshow video detector module 302. The slideshow video detector module 302 can be configured to automatically identify slideshow videos. A slideshow video is similar to a static image video, except that it transitions between multiple static images rather than presenting a single static image. As such, the slideshow video detector module 302 can be configured to identify videos that depict multiple static images, rather than a single static image. As shown in the example of FIG. 3A, the slideshow video detector module 302 can include an interest point detection module 304, a frame comparison module 306, and a suspicious segment identification module 308.

The interest point detection module 304 can be very similar in operation and/or functionality to the interest point detection module 204 of FIG. 2A. The interest point detection module 304 can be configured to identify a plurality of interest points in each video frame of a set of video frames. The set of video frames can be associated with a video (e.g., a video posted to a social networking system). In an embodiment, the set of video frames can include all video frames in the video. In another embodiment, the set of video frames can include a set of sampled video frames collected from the video. For example, the set of sampled video frames can be generated by sampling video frames at regular time intervals in a video (e.g., one video frame every half second).

A set of interest points can be identified in each video frame by utilizing an interest point detector, various examples of which were discussed above with reference to the interest point detection module 204 of FIG. 2A. By identifying interest points in each video frame of a set of video frames, interest points in one video frame can be compared to interest points in another video frame to determine whether there is any change in the position and/or number of interest points between the two video frames. If the two video frames depict the same static image, the number and position of interest points in the two video frames would be substantially the same.

In an embodiment, an interest point detector used to identify interest points in a video frame can also be configured to assign each interest point an interest point signature. Interest point signatures can be unique to an interest point, such that different interest points have different interest point signatures, but if the same interest point is present in multiple video frames, that same interest point will maintain the same interest point signature across the multiple video frames. As will be described in greater detail below, interest point signatures can be used to determine whether two video frames depict the same interest points, and whether and/or to what extent those interest points have changed in position.

The frame comparison module 306 can be very similar in operation and/or functionality to the frame comparison module 206 of FIG. 2A. The frame comparison module 306 can be configured to determine whether two video frames depict the same static image by comparing interest points identified in the two video frames. In an embodiment, a set of video frames can be ordered in a particular order. For example, the set of video frames may be ordered in the same order as they appear within a video from which the set of video frames was collected. In an embodiment, the frame comparison module 306 can, for each video frame in the set of video frames, compare the interest points identified in the video frame to a set of interest points identified in a next video frame (i.e., the video frame occurring immediately after the video frame in the ordered set of video frames).

As discussed above, each interest point may be associated with an interest point signature that uniquely identifies that interest point. In an embodiment, the unique interest point signature for each interest point in a video frame can be used to determine whether that interest point is also present in a next video frame, and to determine whether that interest point has changed position from the video frame to the next video frame. In an embodiment, if a threshold number of interest points in a video frame are present in a next video frame, and maintain approximately the same position in the next video frame, it can be determined that the two video frames depict the same image.

In certain instances, a set of video frames may depict a single static image, but may include some minimal level of motion, e.g., zooming in, zooming out, or panning across the static image. As such, rather than determining whether interest points maintain the exact same position from one video frame to the next, in certain embodiments, the frame comparison module 306 can determine whether a threshold number of interest points are maintained from one video frame to the next, and whether those interest points have changed in position by less than a threshold amount. For example, the frame comparison module 306 can determine whether at least 90% of interest points in a first video frame are also present in a next video frame, and whether those interest points have changed position by less than 10 pixels. If so, the two video frames can be determined to depict the same static image. The frame comparison module 306 can compare each video frame in a set of video frames to the subsequent (i.e., next) video frame to determine whether the two video frames depict the same static image.

The suspicious segment identification module 308 can be configured to identify suspicious segments in a video based on identification of consecutive video frames that depict the same static image. As discussed above, the frame comparison module 306 can determine consecutive pairs of video frames that depict the same static image. If a threshold number of consecutive video frames depict the same static image, those video frames can be identified by the suspicious segment identification module 308 as a suspicious segment. For example, if four or more consecutive video frames are determined to depict the same static image, that group of video frames can be identified as a suspicious segment. If a set of video frames collected from a video has greater than a threshold number of suspicious segments (e.g., greater than three suspicious segments), then the video may be identified as a slideshow video. For example, consider an example scenario in which the threshold number of consecutive video frames required to identify a suspicious segment is 4 consecutive video frames, and the threshold number of suspicious segments required to label a video as a slideshow video is 3 suspicious segments. If video frames 1-5 of a video are determined to depict a first static image, video frames 6-12 of the video are determined to depict a second static image, and video frames 13-20 of the video are determined to depict a third different static image, the video can be identified as a slideshow video.

In certain embodiments, the suspicious segment identification module 308 can be configured to analyze an audio signal of a video as part of a determination of whether or not the video is a slideshow video. Slideshow videos may have background music playing while static images are being shown, and may not include human speech. In an embodiment, if any group of consecutive video frames is identified as a potentially suspicious segment (e.g., a threshold number of consecutive video frames are determined to depict the same static image), the suspicious segment identification module 308 can analyze an audio signal associated with the group of consecutive video frames. If the audio signal has greater than a threshold amount of human speech (e.g., greater than 80% human speech), the group of consecutive video frames can be determined to not be a suspicious segment. In other words, any group of consecutive video frames for which the corresponding audio signal includes a threshold amount of human speech can automatically be labeled as not suspicious. In certain embodiments, a machine learning model can be used to determine whether an audio segment contains human speech, and how much of the audio segment (e.g., what percentage of the audio segment) comprises human speech.

In certain embodiments, various actions may be taken by the suspicious segment identification module 308 in response to determining that a video is a slideshow video. For example, the slideshow video may be downranked by a content ranking system or algorithm (e.g., downranked in a user newsfeed content ranking algorithm). In another example, the slideshow video can be ranked within a content ranking system or algorithm as if it was a static image or collection of static images rather than a video. In yet another example, the slideshow video can be removed from a content ranking system such that it will not be published or presented to other users (e.g., published or presented to users of a social networking system). In certain embodiments, the number and/or ratio of slideshow videos presented to a particular user can be monitored such that the user is not presented with greater than a threshold number or threshold ratio of slideshow videos. Many variations are possible.

FIG. 3B illustrates an example scenario 350 that illustrates functionality of the slideshow video detector module 302, according to an embodiment of the present technology. The example scenario 350 depicts eight video frames 352*a-h* from a set of video frames sampled from a video. The first three video frames 352*a-c* depict a wrapped gift, the next three video frames 352*d-f* depict a tree, and the next two video frames 352*g-h* depict a candy cane. The interest point detection module 304 can be utilized to identify interest points in each video frame 352*a-h*. Interest points are in each video frame 352*a-h* are depicted using dashed circles. The frame comparison module 306 can be utilized to compare interest points in consecutive video frames (e.g., video frame 352*a* can be compared with video frame 352*b*, video frame 352*b* can be compared with video frame 352*c*, video frame 352*c* can be compared with video frame 352*d*, etc.). Comparison of two video frames can include determining whether a threshold number of interest points remain from one video frame to the next, and whether a threshold number of interest points have moved less than a threshold distance from one video frame to the next. In the example scenario 350, it can be seen that video frame 352*b* has the same set of interest points as the video frame 352*a*, and video frame 352*c* has the same set of interest points as the video frame 352*b*, and that each of the interest points maintains the same position from video frame 352*a* to video frame 352*b* to video frame 352*c*. Video frame 352*d* has a different set of interest points from the video frame 352*c*. As such, consecutive video frames 352*a-c* can be grouped together and identified as depicting the same static image. As an example, if the threshold number of consecutive video frames required to label a suspicious segment is two, the video frames 352*a-c* can be identified as a suspicious segment. Similarly, video frames 352*d-f* can be identified as a suspicious segment, and video frames 352*g-h* can be identified as a suspicious segment. As such, this set of video frames has three suspicious segments.

In an embodiment, a video can be identified as a slideshow video if a set of video frames associated with the video includes a threshold number of suspicious segments. For example, if the threshold number of suspicious segments required to label a video a slideshow video is two suspicious segments, the video in the example scenario 350 would be labeled as a slideshow video, whereas if the threshold was four suspicious segments, the video in the example scenario 350 would not be labeled a slideshow video.

Figure 4A:
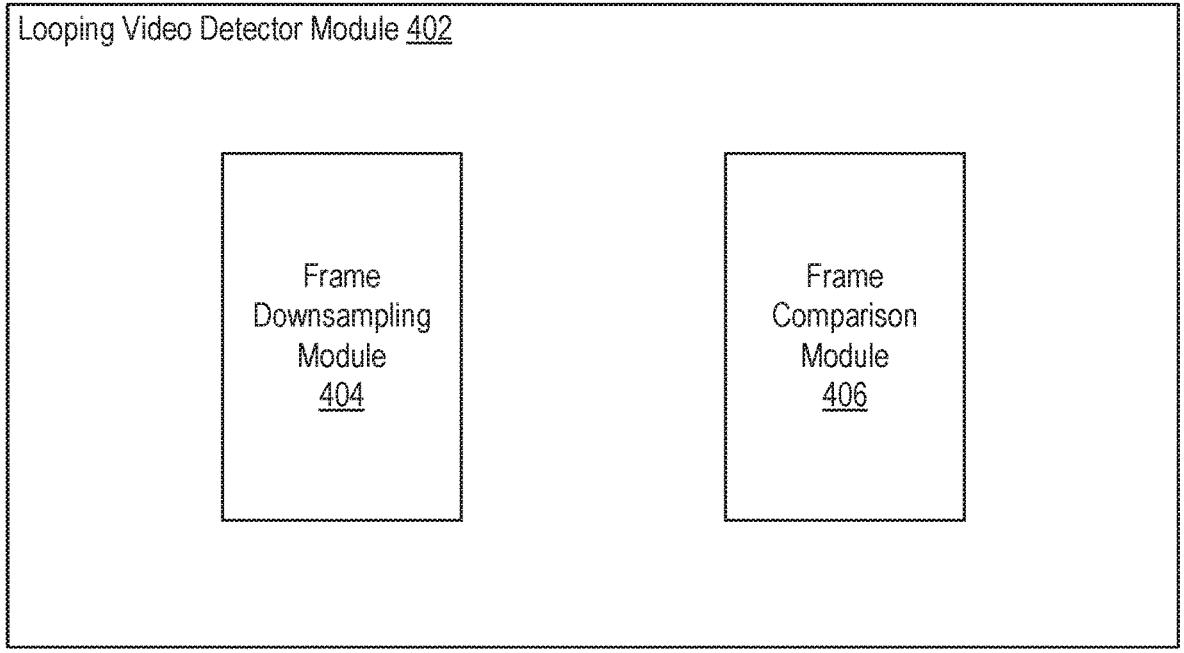
FIG. 4A illustrates a looping video detector module, according to an embodiment of the present technology.

FIG. 4A illustrates an example looping video detector module 402 according to an embodiment of the present technology. In some embodiments, the looping video detector module 108 of FIG. 1 can be implemented as the looping video detector module 402. In certain embodiments, an automatic content ranking system or algorithm may give preference to live streaming videos over, for example, pre-recorded video content, static images, and/or text-only content posts. Users accordingly may improperly attempt to create fake live streaming videos. Fake live streaming videos may be presented as a live streaming video (e.g., uploaded using a feature that enables broadcast of a live content stream over a social networking application), but in reality may present pre-recorded content that is not captured and broadcasted "live" (i.e., in real-time). For example, a user may seemingly initiate a live streaming video broadcast, yet simply have the live streaming video broadcast a looping, pre-recorded video clip. The looping video detector module 402 can be configured to automatically identify such looping or repeating videos. As shown in the example of FIG. 4A, the looping video detector module 402 can include a frame downsampling module 404 and a frame comparison module 406.

The frame downsampling module 404 can be configured to downsample video frame data. As briefly mentioned above, certain users may attempt to manipulate a content ranking algorithm by posting pre-recorded videos as live streaming videos, even though the pre-recorded video is not being captured and broadcasted live. For example, a user may upload a pre-recorded video using a live streaming feature in a social networking system application and have it configured so that the pre-recorded video is presented over and over again on a loop. Of course, the pre-recorded video, although being presented as a live streaming video, is not a genuine live streaming video in that it is not being captured "live," i.e., in real-time. In order to detect such looping videos in substantially real-time, it may be desirable to analyze downsampled video frame data rather than comparing entire video frames. As such, the frame downsampling module 404 can be configured to generate a downsampled video frame for each video frame in a video. For example, in one embodiment, the frame downsampling module 404 can, for each video frame in a set of video frames, collect a pre-defined subset of pixels. The pre-defined subset of pixels in a video frame can define a downsampled video frame for that video frame. The pre-defined subsets of pixels may have the same, fixed positions in each video frame. In this way, downsampled video frames can be compared to determine whether two video frames from which the downsampled video frames were derived depict (or likely depict) the same content.

Figure 4B:
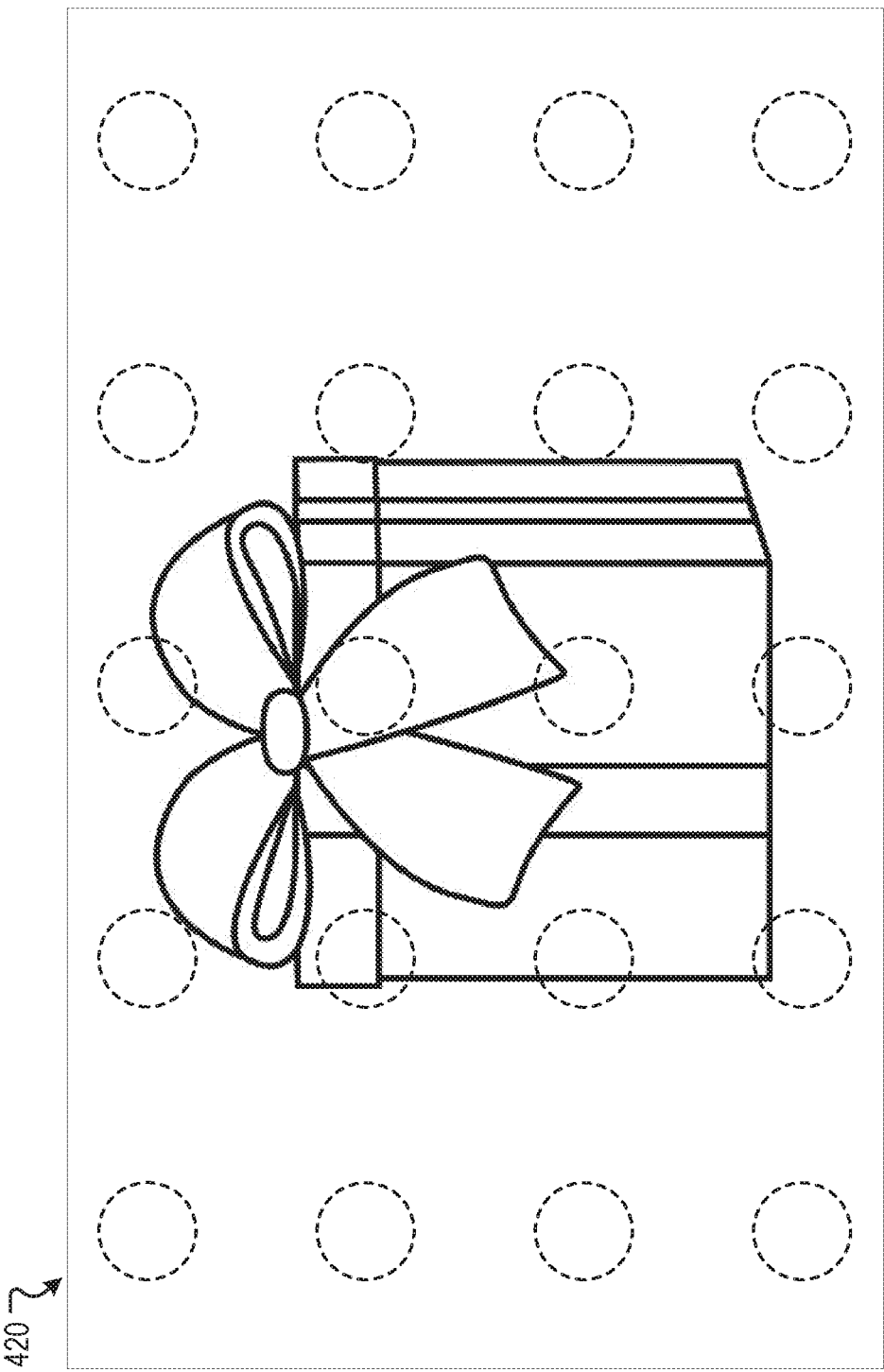
FIG. 4B illustrates an example scenario associated with looping video detection, according to an embodiment of the present technology.

An example of a downsampled video frame is demonstrated in FIG. 4B. FIG. 4B includes a video frame 420. The video frame 420 depicts a wrapped gift. A downsampled video frame associated with the video frame 420 can be generated by collecting and storing pixel data from a pre-defined subset of pixels positioned at fixed locations within the video frame 420. In the video frame 420, a downsampled video frame is generated by collecting and storing only those pixels within the dotted circles shown in FIG. 4B. Subsets of pixels at the same locations/positions in the video frame can be collected from each video frame. If two video frames depict identical content, the subsets of pixels collected from the two video frames will also be identical.

Returning to FIG. 4A, the frame comparison module 406 can be configured to identify a looping video by comparing video frames within a video. As mentioned above, in certain embodiments, comparison of video frames may comprise comparison of downsampled video frames, i.e., downsampled versions of video frames. If a video is a looping video, it will repeatedly present the same set of video frames multiple times. In other words, a first set of consecutive video frames in the video will be repeated in or as a second set of consecutive video frames occurring later on in the video. As such, the frame comparison module 406 can be configured to determine whether, for a particular video, a first set of consecutive video frames of a threshold length matches an earlier-occurring second set of consecutive video frames. If so, the video can be identified as a looping video.

As mentioned, if a video is a looping video, at some point within the video, video frames will begin to repeat themselves such that video frame a will be the same as video frame b, video frame a+1 will be the same as video frame b+1, video frame a+2 will be the same as video frame b+2, and so forth. In certain embodiments, the frame comparison module 406 can identify a first comparison video frame in a video. The first comparison video frame can be arbitrarily selected and, as such, may be the first video frame in the video, the $100^{th}$ video frame in the video, or any other video frame in the video. The first comparison video frame will act as a point of reference to determine if/when the video starts to loop or repeat itself. Each video frame occurring after the first comparison video frame can be compared to the first comparison video frame until a first matching video frame that is substantially identical to the first comparison video frame is found. For example, the first comparison video frame may be the first video frame in a video (i.e., frame 1), and video frames can be sequentially compared with frame 1 until a matching video frame, frame y, is identified that is substantially identical to frame 1.

Once the frame comparison module 406 identifies a matching video frame y that is substantially identical to the first comparison video frame (in this example, frame 1), the frame comparison module 406 can then compare video frame y+1 to video frame 2 of the video to determine whether those video frames are substantially identical. If video frame y+1 is found to be substantially identical to video frame 2, then video frame y+2 can be compared to video frame 3 of the video, and so forth. If a threshold number of consecutive video frames are determined to be identical to one another, the video can be identified as a looping video. For example, if the threshold number of consecutive video frames is 20, and frame comparison module 406 determines that video frames 201-220 are identical to video frames 1-20, the frame comparison module 406 can determine that the video is a looping video. However, if less than the threshold number of consecutive video frames are determined to be identical, then the video frame module 406 can return to comparing video frames to the first comparison video frame. For example, if the threshold number of video frames is 20, and the frame comparison module 406 determines that video frames 201-211 are identical to video frames 1-11, but video frame 212 is different from video frame 12, then the threshold number of consecutive video frames has not been met. As such, the frame comparison module 406 can return to comparing video frames to video frame 1 to identify the next matching video frame.

In one embodiment, comparison of two video frames may be performed using pixel level subtraction. In certain embodiments, encoding artifacts may cause two video frames to have minor differences at a pixel level even if they depict identical content. As such, the frame comparison module 406 can be configured to incorporate a threshold level of tolerance for differences between two video frames. In other words, if two video frames are similar to within a threshold level of similarity (e.g., a threshold percentage of pixels in two video frames have less than a threshold level of difference), the two video frames can be identified as depicting identical content.

In certain instances, the first few moments (e.g., minutes) of a genuine live streaming video may include a temporarily looping video. For example, a live streaming video may be initiated five minutes before a live news broadcast actually begins. For those five minutes, the live streaming video may depict a spinning logo for the news broadcast. In order to address such situations, in certain embodiments, a set period of time at the beginning of a video (e.g., the first 5 minutes, the first 10 minutes, the first 15 minutes, etc.) can be excluded from the looping video analysis described above. In such embodiments, the first comparison video frame may be defined as the first video frame occurring after the pre-determined period of time at the beginning of a video. For example, if the first 5 minutes of a video are to be excluded from the looping video analysis, the first comparison video frame may be defined as the first video frame occurring after the first five minutes of the video.

As mentioned above, in certain embodiments, a video being analyzed may be a live streaming video. At any given point in time, a live streaming video may comprise n video frames (e.g., after 1 second of live streaming, n may be 10 frames, after 2 seconds of live streaming, n may be 20 frames, and so forth). In an embodiment, for each new frame received in a live streaming video (referred to as the nth frame), the frame comparison module 406 can compare video frame n/2 with a first comparison video frame. For example, if the first comparison video frame is the first video frame of a video (i.e., video frame 1), and a live stream has 100 video frames at a particular time (n=100), the $50^{th}$ video frame of the live stream (video frame n/2) can be compared with video frame 1 to determine whether the $50^{th}$ video frame is substantially identical to video frame 1. In certain embodiments, if the first few minutes of a video are excluded from the looping video analysis, the nth video frame may be the nth video frame received after the initial time period. If video frame n/2 at a given moment is determined not to be identical to the first comparison video frame, then the frame comparison module 406 can continue to compare video frame n/2 with the first comparison video frame as new video frames are received until a matching video frame is found (e.g., when video frame 102 is received, video frame 51 can be compared with frame 1, and when video frame 104 is received, frame 52 can be compared with frame 1, and so forth). In certain embodiments, the threshold number of frames required to determine that a video is a looping video may vary based on how many frames have been received in a live streaming video (i.e., based on n).

In certain embodiments, genuine live streaming videos (e.g., non-looping, non-pre-recorded videos that are being captured in real-time) may include a visual component that is static. For example, a live streaming video may be a black screen or a single, static image with audio overlaid on the black screen or static image. Such static image videos may incorrectly be identified as looping videos, since they would include multiple sets of consecutive frames that are identical to one another. In order to address this potential problem, when a potential looping video is identified using the analysis described above, a set of consecutive video frames can be compared with one another to determine whether the set of consecutive video frames depict a static image or whether the set of consecutive video frames depict different content. In an embodiment, the set of consecutive video frames can be a set of consecutive video frames that encompass a pre-defined period of time. For example, consider an example scenario in which video frames 101-120 are determined to be identical to video frames 1-20, satisfying a threshold of 20 consecutive video frames for a video to be identified as a potential looping video. Once this determination is made, five seconds of consecutive video frames starting from video frame 1 can used to define a set of consecutive video frames (this may comprise, for example frames 1-100). Video frames in the set of consecutive video frames can be compared to one another (e.g., video frame 1 can be compared to video frame 2, video frame 2 can be compared to video frame 3, and so forth). In an embodiment, if a threshold number of video frames in the set of consecutive video frames do not differ from one another, the video can be determined to be a static video rather than a looping video. However, if greater than a threshold number of video frames in the set of consecutive video frames differ from one another, the video can be identified as a looping video. For example, if fewer than 5 video frames in the set of consecutive video frames differ from one another, a determination can be made that the video is a static video with a static visual component rather than a looping video. If greater than 5 video frames in the set of consecutive video frames differ from one another, the video can be identified as a looping video.

In certain embodiments, various actions may be taken by the frame comparison module 406 in response to determining that a video is a looping video. For example, if the looping video is being presented as a live streaming, the live streaming video can be terminated. Or in another example, the looping video, rather than being ranked by a content ranking system as a live streaming video, can be ranked as a pre-recorded video. In yet another example, the looping video can be removed from a content ranking system such that it will not be published or presented to other users (e.g., published or presented to users of a social networking system). Many variations are possible.

Figure 4C:
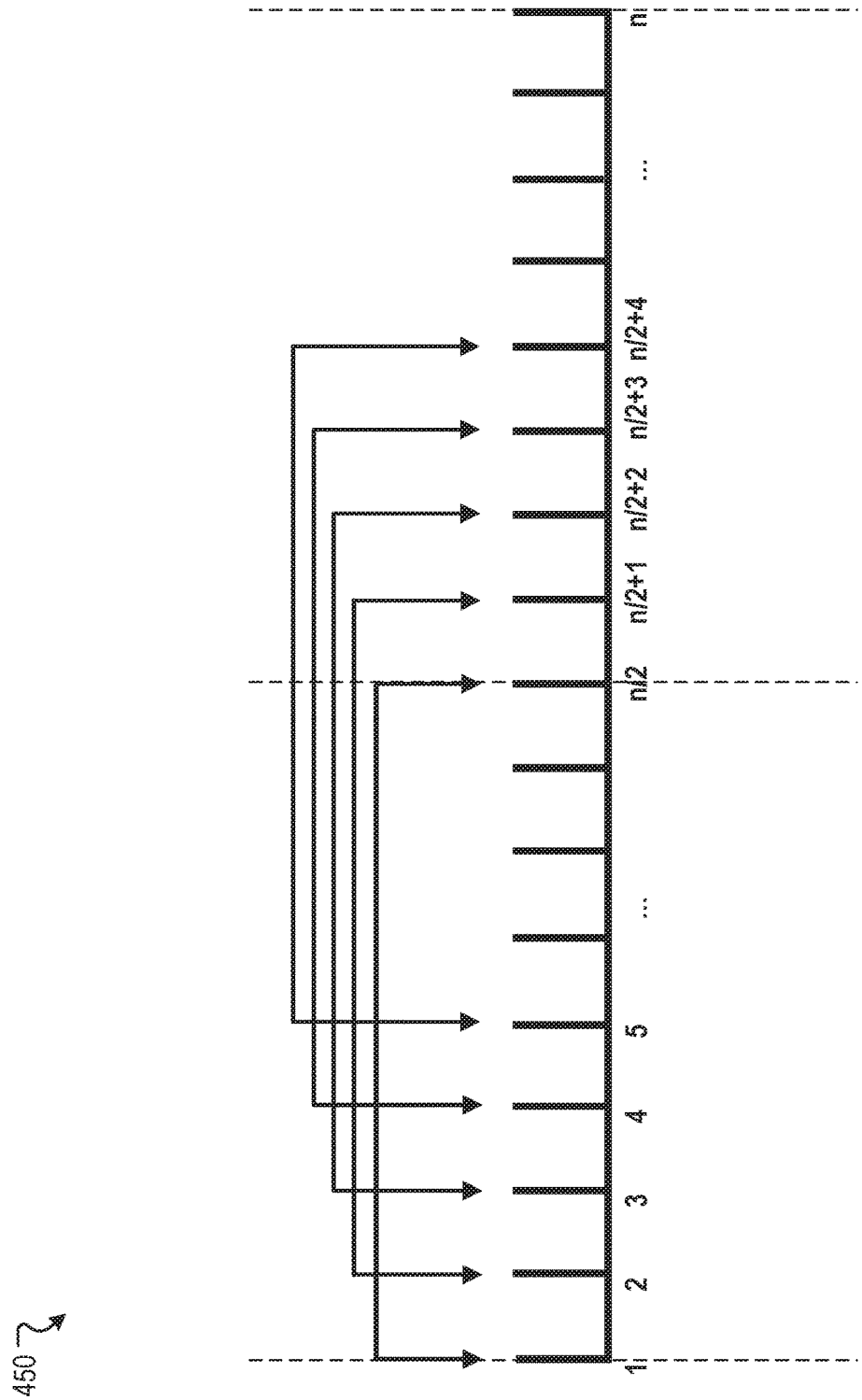
FIG. 4C illustrates an example scenario associated with looping video detection, according to an embodiment of the present technology.

FIG. 4C illustrates an example scenario 450 that illustrates functionality of the looping video detector module 402, according to an embodiment of the present technology. In the example scenario 450, a video includes a set of video frames, video frames 1–n. A video frame n/2 is compared with video frame 1, and is determined to be identical to video frame 1. As a result of that determination, video frame n/2+1 is compared to video frame 2, and those video frames are determined to be identical. As a result of that determination, video frame n/2+2 is compared to video frame 2, and those video frames are determined to be identical. This iterative comparison of subsequent video frames continues until either a threshold number of consecutive video frames are determined to be identical to one another, or two video frames are determined not to be identical to one another. If the threshold number of consecutive video frames are determined to be identical to one another, the video is identified as a looping video. However, if two video frames are determined not to be identical before the threshold number of consecutive video frames are identified as being identical, then subsequent video frames are then compared to frame 1 until a new matching video frame is found. At that point, the iterative comparison of subsequent video frames can begin again.

Figure 5A:
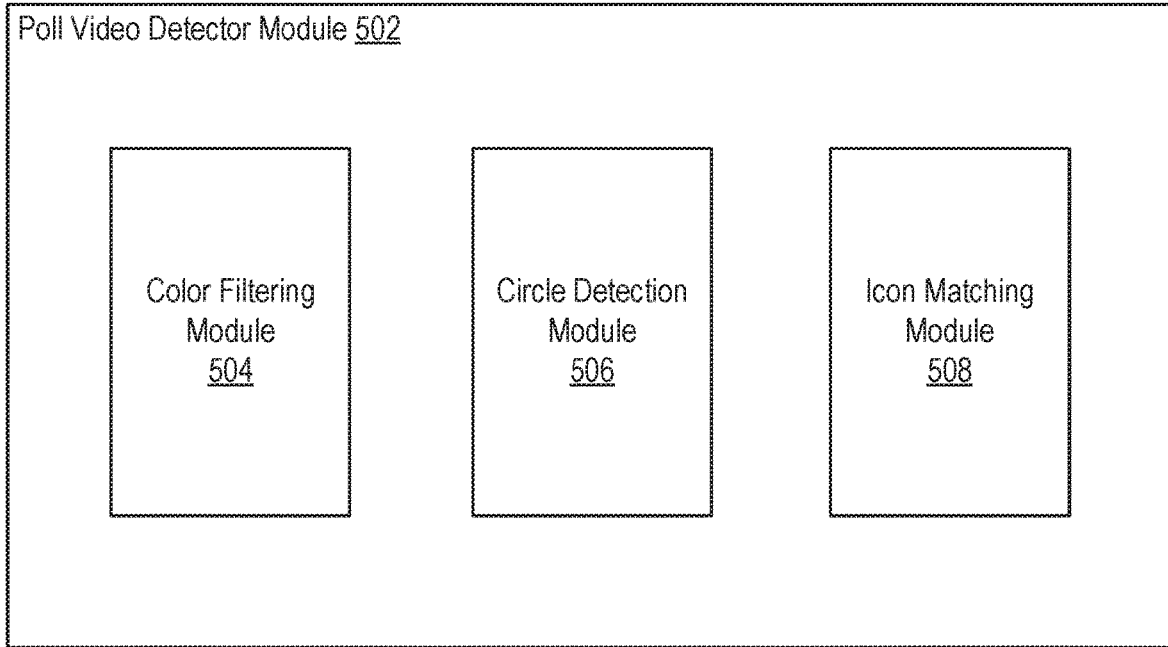
FIG. 5A illustrates a poll video detector module, according to an embodiment of the present technology.

FIG. 5A illustrates an example poll video detector module 502 according to an embodiment of the present technology. In some embodiments, the poll video detector module 110 of FIG. 1 can be implemented as the poll video detector module 502. The poll video detector module 502 can be configured to automatically identify poll videos. As briefly mentioned above, poll videos posted to, for example, a social networking system can encourage users to vote between two or more options using user engagement features on a social networking system (e.g., a set of reaction icons). For example, a poll video may be a video that asks users a question (e.g., "Do you prefer apples or oranges?") and urges users to vote using various reaction icons (e.g., "Select the 'like' reaction icon for apples, or the 'love' reaction icon for oranges."). Such poll videos may be problematic for various reasons. For example, poll videos may attempt to manipulate automatic content ranking systems or algorithms that give higher preference to content that has large amounts of user engagement. In an embodiment, the poll video detector module 502 can be configured to identify videos that depict two or more reaction icons of a set of pre-defined of reaction icons, and to identify any such videos as potential poll videos. As shown in the example of FIG. 5A, the poll video detector module 502 can include a color filtering module 504, a circle detection module 506, and an icon matching module 508.

The color filtering module 504 can be configured to receive a set of video frames associated with a video, and to filter each video frame based on one or more pre-defined colors. As mentioned above, a poll video may urge users to vote between two or more options using reaction icons in a pre-defined set of reaction icons. For example, a social networking system may provide a set of reaction icons for users to react to content posted to the social networking system. Some examples of reaction icons may include a "like" icon to indicate that a user likes a content item, a "love" icon to indicate that a user loves a content item, a "laugh" icon to indicate that a user finds a content item humorous, a "wow" icon to indicate that a user finds a content item surprising or extraordinary, a "sad" icon to indicate that a user finds a content item sad, or an "angry" icon to indicate that a user finds a content item to be upsetting or infuriating.

Each reaction icon may be associated with one or more shapes and colors. For example, the "love" icon may comprise a heart in a particular shade of red, the "sad" icon may comprise a sad face in a particular shade of yellow, and/or the "angry" icon may comprise an angry face with a gradient of colors that includes specific shades of yellow, orange, and red. Each specific color used in a reaction icon may be defined by an RGB value. As such, each reaction icon may be associated with one or more RGB values that are used in the reaction icon. The RGB values for all of the reaction icons in the set of reaction icons can define a set of RGB values associated with the set of reaction icons. In certain instances, a poll video may depict each reaction icon with slightly different shades/colors (e.g., due to minor variations caused by different encoding techniques). As such, each RGB value associated with a reaction icon can be broadened to include a range of RGB values that approximate the RGB value, such that each reaction icon is associated with one or more ranges of RGB values, and the set of RGB values associated with a set of reaction icons can include these broadened ranges of RGB values.

In an embodiment, the color filtering module 504 can, for each video frame in a set of video frames, filter out any pixels in the video frame that depict a color that is not included in the set of RGB values. For example, each such pixel in a video frame can be made black or made white. Any pixel that depicts a color that is included in the set of RGB values can be left unchanged. Video frames that have been filtered by the color filtering module 504 can define a set of color-filtered video frames.

The circle detection module 506 can be configured to detect any circles depicted in each video frame of a set of video frames. In certain embodiments, each reaction icon of the set of reaction icons may be associated with a particular shape. For example, in one embodiment, each reaction icon may be in the form of a circle. For example, the "love" icon may be a heart contained within a circle, the "laugh" icon may be a laughing circular face, the "sad" icon may be a sad circular face, etc. In such embodiments, the circle detection module 506 can receive color-filtered video frames filtered by the color filtering module 504, and detect any circles depicted in the video frames. In an embodiment, circles may be detected using Hough transforms. While the example of circles is used herein, it should be understood that any shapes can be detected based on the shapes of the pre-defined set of reaction icons. For example, if certain reaction icons are in the shape of a square or a triangle, squares or triangles may be detected rather than and/or in addition to circles.

The icon matching module 508 can be configured to identify, for each video frame in a set of video frames, any reaction icons of the pre-defined set of reaction icons depicted in the video frame. As discussed above, in certain embodiments, each reaction icon may be in a particular shape (e.g., a circle). The circle detection module 506 has identified each circle in a video frame. Each identified circle can be compared to the known set of reaction icons to determine whether the circle matches a known reaction icon. In one embodiment, this comparison may be performed using pixel subtraction. However, in certain more complex instances, a poll video may present an animated or slightly modified version of a reaction icon. In such instances, pixel subtraction may not accurately determine whether a particular circle depicts a known reaction icon. To account for this, in certain embodiments, shape context feature descriptors can be used to determine whether a reaction icon is depicted in a video frame. Shape context is a feature descriptor that allows for measuring of similarity between two shapes that may not necessarily be identical. If a particular circle is determined to be within a threshold level of similarity to a known reaction icon based on shape context, the circle can be determined to depict the reaction icon. If the icon matching module 508 determines that two or more reaction icons are depicted in a threshold number of video frames in a video, the video can be identified as a poll video.

In certain embodiments, various actions may be taken by the icon matching module 508 in response to determining that a video is a poll video. For example, the poll video may be downranked by a content ranking system. In another example, the poll video can be removed from a content ranking system such that it will not be published or presented to other users (e.g., published or presented to users of a social networking system). In certain embodiments, the number and/or ratio of poll videos presented to a particular user can be monitored such that the user is not presented with greater than a threshold number or threshold ratio of poll videos. Many variations are possible.

FIG. 5B illustrates an example scenario 550 that illustrates functionality of the poll video detector module 502, according to an embodiment of the present technology. In the example scenario 550, a video frame 552 from a video is shown. The video frame 552 urges users to vote on the question, "What is the best gift?" The video frame 552 indicates that users can vote for the option "video games" using a smiley face reaction icon 554, and can vote for the option "board games" using a heart reaction icon 556. The video frame 552 also includes current vote totals for each option (video games has received 520 votes, while board games has received 1003 votes). The color filtering module 504 can filter out from the video frame 552 any pixels that depict a color that does not match a set of RGB values associated with a set of pre-defined reaction icons. The circle detection module 504 can then take the color-filtered video frame and identify any circles depicted in the video frame 552. The example scenario 550 depicts a modified video frame 554 which depicts two circles that have been identified by the video frame 552. Each of the circles can be compared to each reaction icon in the pre-defined set of reaction icons to determine whether each circle depicts a reaction icon in the set of reaction icons. In the example scenario 550, it is determined that the video frame 552 depicts two reaction icons. If it is determined that two or more reaction icons are depicted in a threshold number of video frames in the video, the video can be identified as a poll video.

Figure 6A:
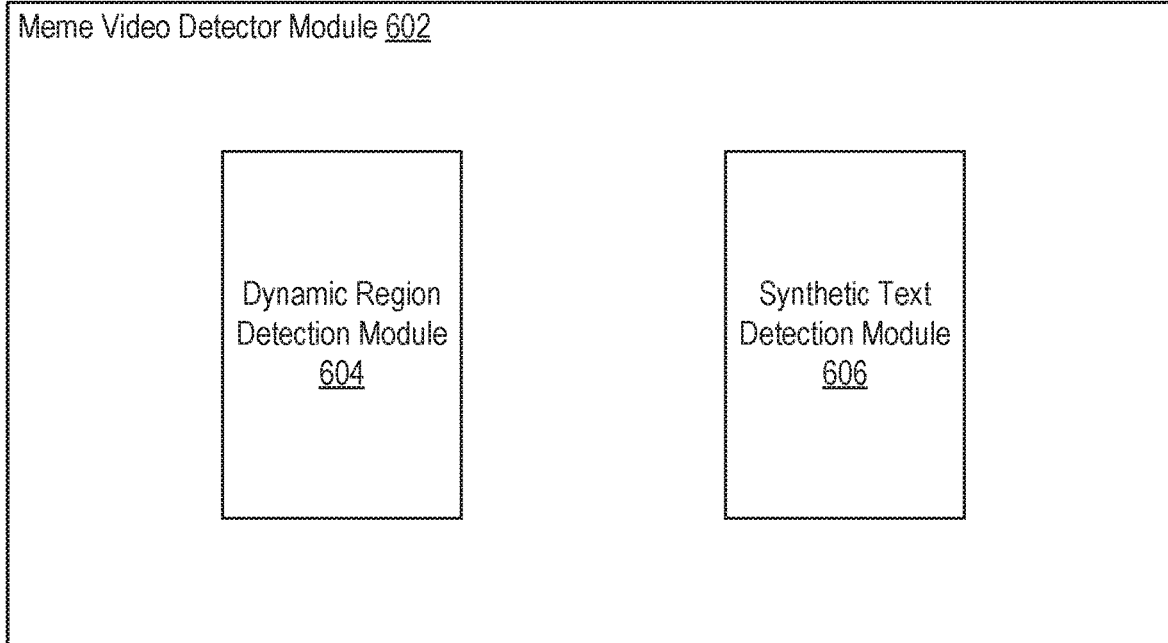
FIG. 6A illustrates a meme video detector module, according to an embodiment of the present technology.

FIG. 6A illustrates an example meme video detector module 602 according to an embodiment of the present technology. In some embodiments, the meme video detector module 112 of FIG. 1 can be implemented as the meme video detector module 602. In general, a meme video may include text overlaid on image or video content. The text may be added after the image and/or video content has been captured, such that the text does not belong to the originally captured image or video content, but is added after-the-fact. In various embodiments, the meme video detector module 602 can identify meme videos based on identification of such synthetically added text. As shown in the example of FIG. 6A, the meme video detector module 602 can include a dynamic region detection module 604 and a synthetic text detection module 606.

The dynamic region detection module 604 can be configured to identify dynamic regions in video frames. A dynamic region in a video frame may represent a region in the video frame in which a threshold level of movement is detected. As mentioned above, a meme video may be detected based on the presence of synthetic text that has been added to image and/or video content. However, certain non-meme videos may also include synthetically added text. For example, a news broadcast might include a ticker of moving text overlaid on video of a newsperson. In order to distinguish between the static synthetic text that is typically present in meme videos, and moving text that may be added to other types of videos, the dynamic region detection module 604 can identify dynamic regions in video frames.

In an embodiment, a set of video frames can be collected from a video. The set of video frames may include all or some video frames from the video. In one embodiment, the set of video frames may comprise a fixed number of video frames from a beginning portion of the video (e.g., the first 500 frames of the video). In one embodiment, the set of video frames may comprise video frames that encompass a pre-determined timeframe within the video (e.g., the first thirty seconds of the video). Each video frame in the set of video frames can be compared with an immediately preceding video frame. For example, the second video frame can be compared with the first video frame, the third video frame can be compared with the second video frame, and so forth. The dynamic region detection module 604 can identify each row of pixels in which a change is detected from one frame to the next. For each row in which a change is detected (or a threshold number of changes are detected) in a threshold number of video frames can be identified as a "dynamic row." For example, consider an example scenario in which each video frame has 256 rows of pixels, and a set of video frames has 50 video frames. For each of the 50 video frames, each row is identified that changes from one video frame to the next. Using this information, it can be determined, for each row, how many times the row changes over the course of the 50 video frames. For example, a first row may change in 24 of the 50 video frames, a second row may change in 0 of the 50 video frames, and a third row may change in all 50 video frames. Each row that satisfies a threshold number of video frames in which the row changes can be identified as a dynamic row. For example, if the threshold number of video frames is 20 video frames, the first and third rows may be identified as dynamic rows, while the second row may be determined not to be a dynamic row. The set of rows identified as dynamic rows may define one or more dynamic regions in the set of video frames. All identified dynamic rows can be filtered out (e.g., turned black) in each video frame of the video to define a modified video frame in a set of modified video frames.

The synthetic text detection module 606 can be configured to identify synthetic text in each modified video frame of the set of modified video frames. Once the dynamic region detection module 604 has filtered out all dynamic regions, only static/unchanging portions of a video frame remain in each modified video frame. These static portions can be analyzed by the synthetic text detection module 606 to identify any synthetic text. In an embodiment, each modified video frame of the set of modified video frames can be provided to a machine learning model that is trained to identify synthetic text overlaid on an image. If a video is determined to have static, synthetic text overlaid on image and/or video content in a threshold number of video frames, the video can be identified as a meme video.

In certain embodiments, various actions may be taken by the synthetic text detection module 606 in response to determining that a video is a meme video. For example, the meme video may be downranked by a content ranking system. In another example, the meme video can be removed from a content ranking system such that it will not be published or presented to other users (e.g., published or presented to users of a social networking system). In certain embodiments, the number and/or ratio of meme videos presented to a particular user can be monitored such that the user is not presented with greater than a threshold number or threshold ratio of meme videos. Many variations are possible.

Figure 6B:
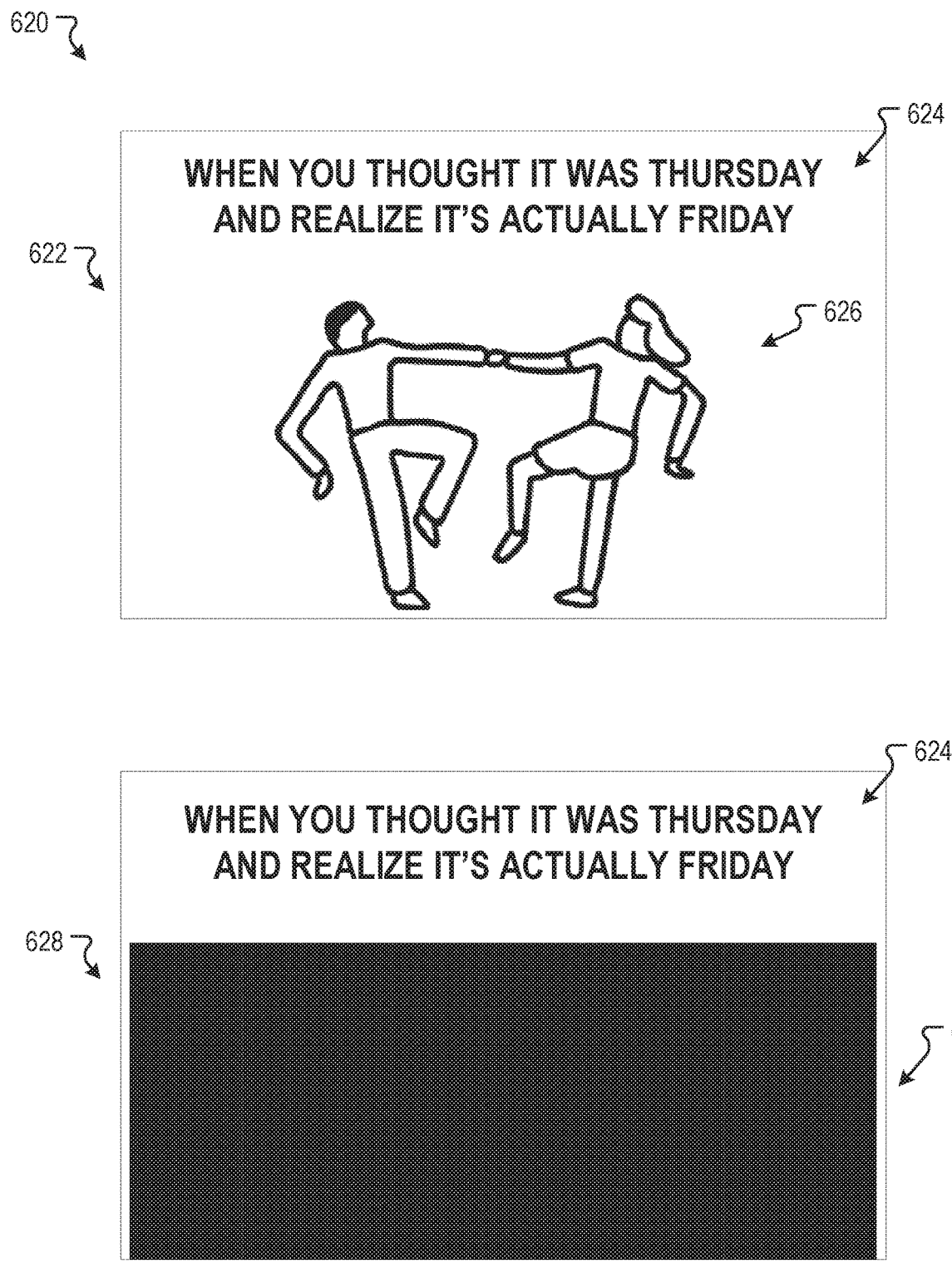

FIGS. 6B and 6C illustrate example scenarios 620, 640 that illustrate functionality of the meme video detector module 602, according to an embodiment of the present technology. In the example scenario 620 depicted in FIG. 6B, a video frame 622 from a meme video is depicted. The meme video includes a video of a couple dancing (arrow 626) overlaid with static, synthetic text 624 which reads "When you thought it was Thursday and realize it's actually Friday." The example scenario 620 also depicts a modified video frame 628 in which dynamic regions have been blacked out. The video of the dancing couple 626 is a dynamic region. Each row in which pixels change from one frame to the next is blacked out (arrow 630). These same rows can be blacked out in each video frame of the meme video. The static, synthetic text 624 does not change from one frame to another, so it is not blacked out, and would remain unfiltered (e.g., not blacked out) in each video frame of the meme video. The modified video frame 628 can be provided to a machine learning model that is trained to identify synthetic text overlaid on an image. In the example scenario 620, the machine learning model would identify that the modified video frame 628 (and, therefore, the video frame 622) includes static, synthetic text 624 overlaid on an image. A modified version of every frame in the meme video can be similarly provided to the trained machine learning model. If a threshold number of video frames are identified as having synthetic text overlaid on an image, the video can be identified as a meme video.

In the example scenario 640 depicted in FIG. 6C, a video frame 642 is taken from a news broadcast (i.e., not a meme video). The news broadcast includes a rotating logo 644 and an overlaid text ticker 646 with moving text. The rotating logo 644 and the moving text ticker 646 are identified as dynamic regions. As such, each row in those regions is blacked out in a modified video frame 648. The same rows can be blacked out in each video frame of the news broadcast video. The modified video frame 648 is provided to a machine learning model that is trained to identify synthetic text overlaid on an image. In this modified video frame 648, the machine learning model would not identify any synthetic text, and the news broadcast would not be identified as a meme video. A modified version of each video frame in the news broadcast can be provided to the trained machine learning model. If less than a threshold number of video frames are identified as having synthetic text overlaid on an image, the news broadcast can be determined not to be a meme video.

Figure 7:
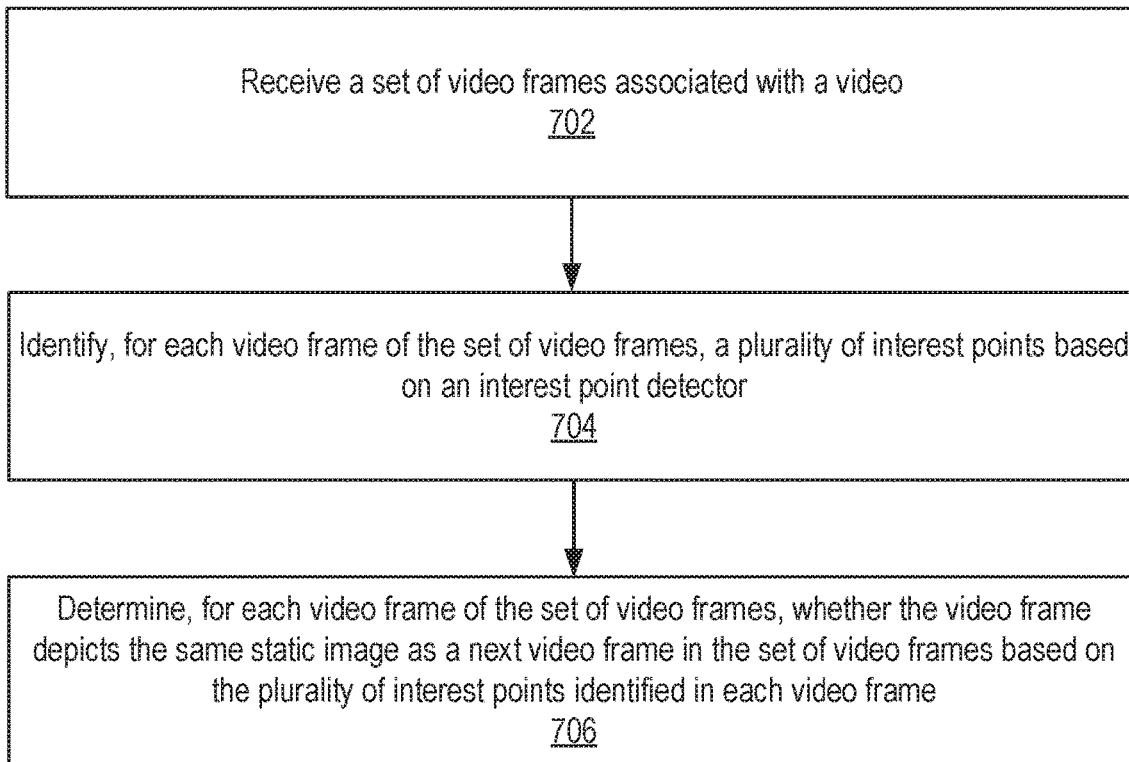
FIG. 7 illustrates an example method associated with static image video detection, according to an embodiment of the present technology.

FIG. 7 illustrates an example method 700 associated with static image video detection, according to an embodiment of the present technology. It should be appreciated that there can be additional, fewer, or alternative steps performed in similar or alternative orders, or in parallel, within the scope of the various embodiments discussed herein unless otherwise stated.

At block 702, the example method 700 can receive a set of video frames associated with a video. At block 704, the example method 700 can identify, for each video frame of the set of video frames, a plurality of interest points based on an interest point detector. At block 706, the example method 700 can determine, for each video frame of the set of video frames, whether the video frame depicts the same static image as a next video frame in the set of video frames based on the plurality of interest points identified in each video frame.

FIG. 8 illustrates an example method 800 associated with slideshow video detection, according to an embodiment of the present technology. It should be appreciated that there can be additional, fewer, or alternative steps performed in similar or alternative orders, or in parallel, within the scope of the various embodiments discussed herein unless otherwise stated.

At block 802, the example method 800 can receive a set of video frames associated with a video. At block 804, the example method 800 can identify, for each video frame of the set of video frames, a plurality of interest points based on an interest point detector. At block 806, the example method 800 can determine that a first set of consecutive video frames from the set of video frames depicts a first static image based on the plurality of interest points, the first set of consecutive video frames defining a first suspicious segment. At block 808, the example method 800 can determine that a second set of consecutive video frames from the set of video frames depicts a second static image based on the plurality of interest points, the second set of consecutive video frames defining a second suspicious segment. At block 810, the example method 800 can identify the video as a slideshow video based on a determination that the set of video frames comprises a threshold number of suspicious segments FIG. 9 illustrates an example method 900 associated with looping video detection, according to an embodiment of the present technology. It should be appreciated that there can be additional, fewer, or alternative steps performed in similar or alternative orders, or in parallel, within the scope of the various embodiments discussed herein unless otherwise stated.

At block 902, the example method 900 can receive a set of video frames associated with a video. At block 904, the example method 900 can determine that a first set of consecutive video frames of the set of video frames depicts identical content to a second set of consecutive video frames of the set of video frames, wherein the first set of consecutive video frames and the second set of consecutive video frames satisfy a threshold number of consecutive video frames. At block 906, the example method 900 can identify the video as a looping video based on the determination that the first set of consecutive video frames depicts identical content to the second set of consecutive video frames.

Figure 10:
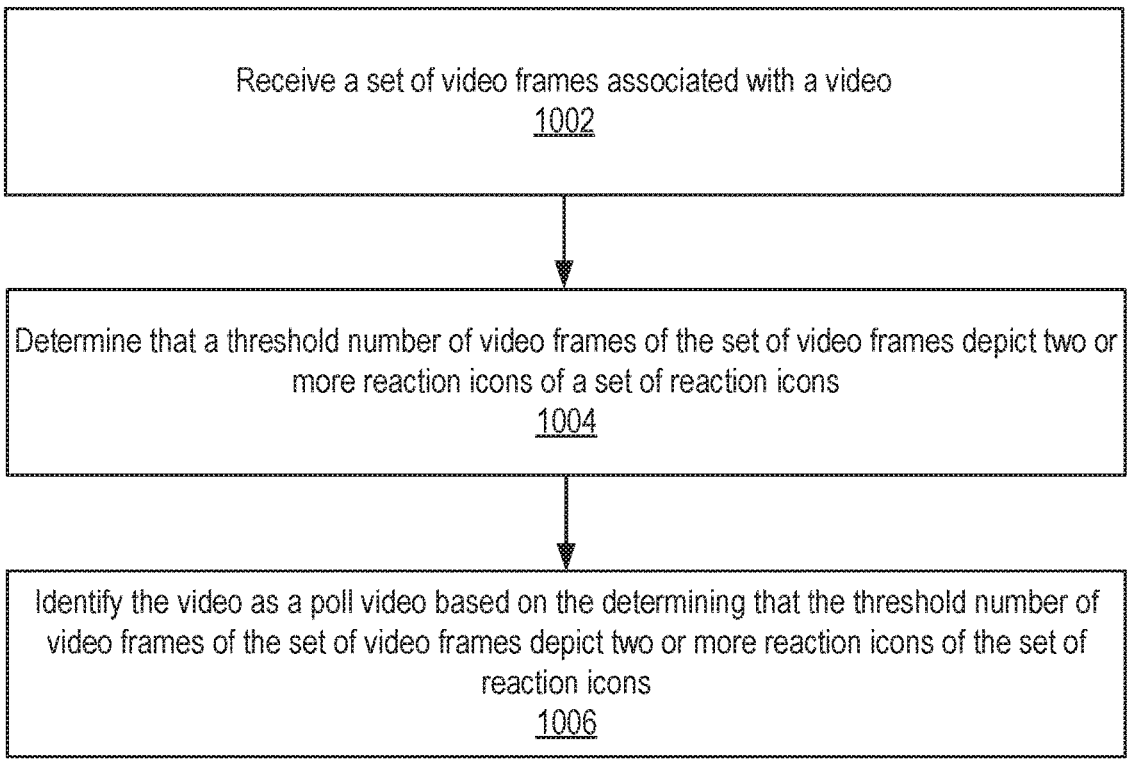
FIG. 10 illustrates an example method associated with poll video detection, according to an embodiment of the present technology.

FIG. 10 illustrates an example method 1000 associated with poll video detection, according to an embodiment of the present technology. It should be appreciated that there can be additional, fewer, or alternative steps performed in similar or alternative orders, or in parallel, within the scope of the various embodiments discussed herein unless otherwise stated.

At block 1002, the example method 1000 can receive a set of video frames associated with a video. At block 1004, the example method 1000 can determine that a threshold number of video frames of the set of video frames depict two or more reaction icons of a set of reaction icons. At block 1006, the example method 1000 can identify the video as a poll video based on the determining that the threshold number of video frames of the set of video frames depict two or more reaction icons of the set of reaction icons.

Figure 11:
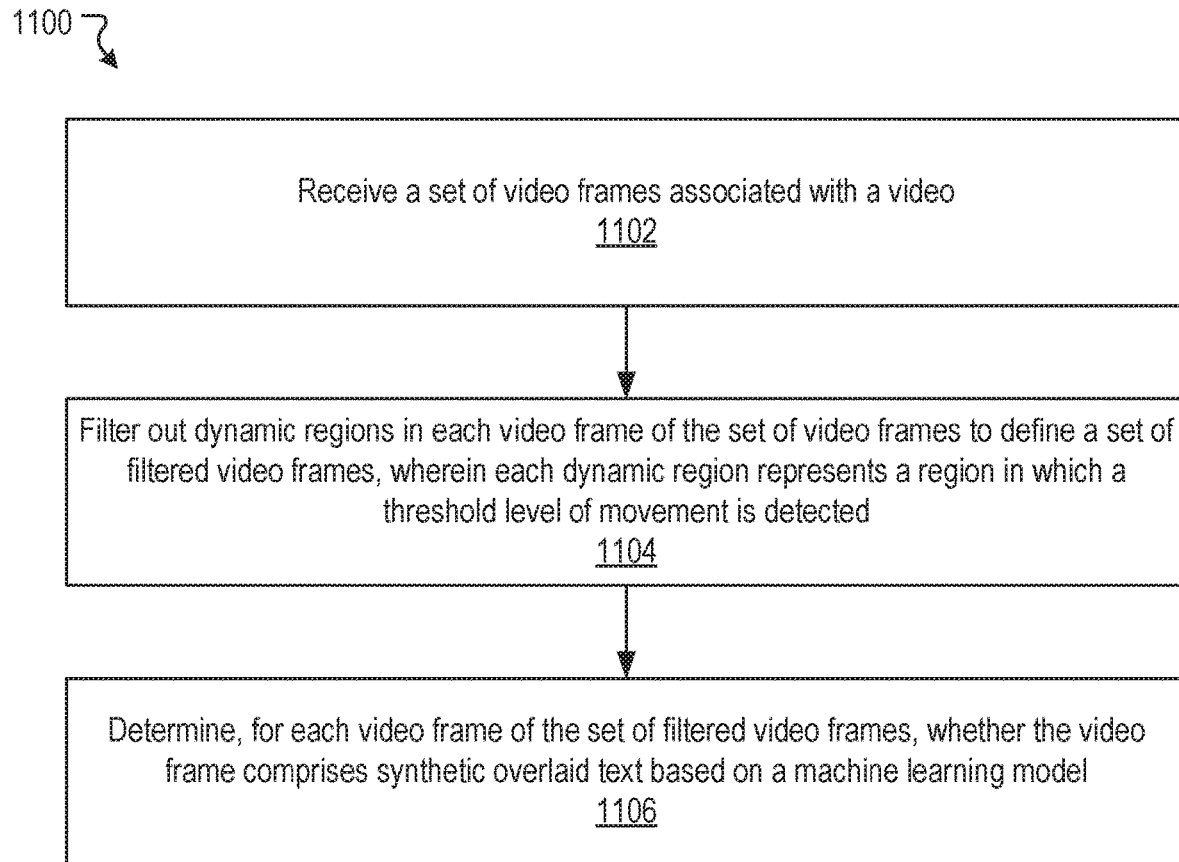
FIG. 11 illustrates an example method associated with meme video detection, according to an embodiment of the present technology.

FIG. 11 illustrates an example method 1100 associated with meme video detection, according to an embodiment of the present technology. It should be appreciated that there can be additional, fewer, or alternative steps performed in similar or alternative orders, or in parallel, within the scope of the various embodiments discussed herein unless otherwise stated.

At block 1102, the example method 1100 can receive a set of video frames associated with a video. At block 1104, the example method 1100 can filter out dynamic regions in each video frame of the set of video frames to define a set of filtered video frames, wherein each dynamic region represents a region in which a threshold level of movement is detected. At block 1106, the example method 1100 can determine, for each video frame of the set of filtered video frames, whether the video frame comprises synthetic overlaid text based on a machine learning model.

It is contemplated that there can be many other uses, applications, and/or variations associated with the various embodiments of the present technology. For example, in some cases, users can choose whether or not to opt-in to utilize the disclosed technology. The disclosed technology can also ensure that various privacy settings and preferences are maintained and can prevent private information from being divulged. In another example, various embodiments of the present technology can learn, improve, and/or be refined over time.

Social Networking System—Example Implementation

Figure 12:
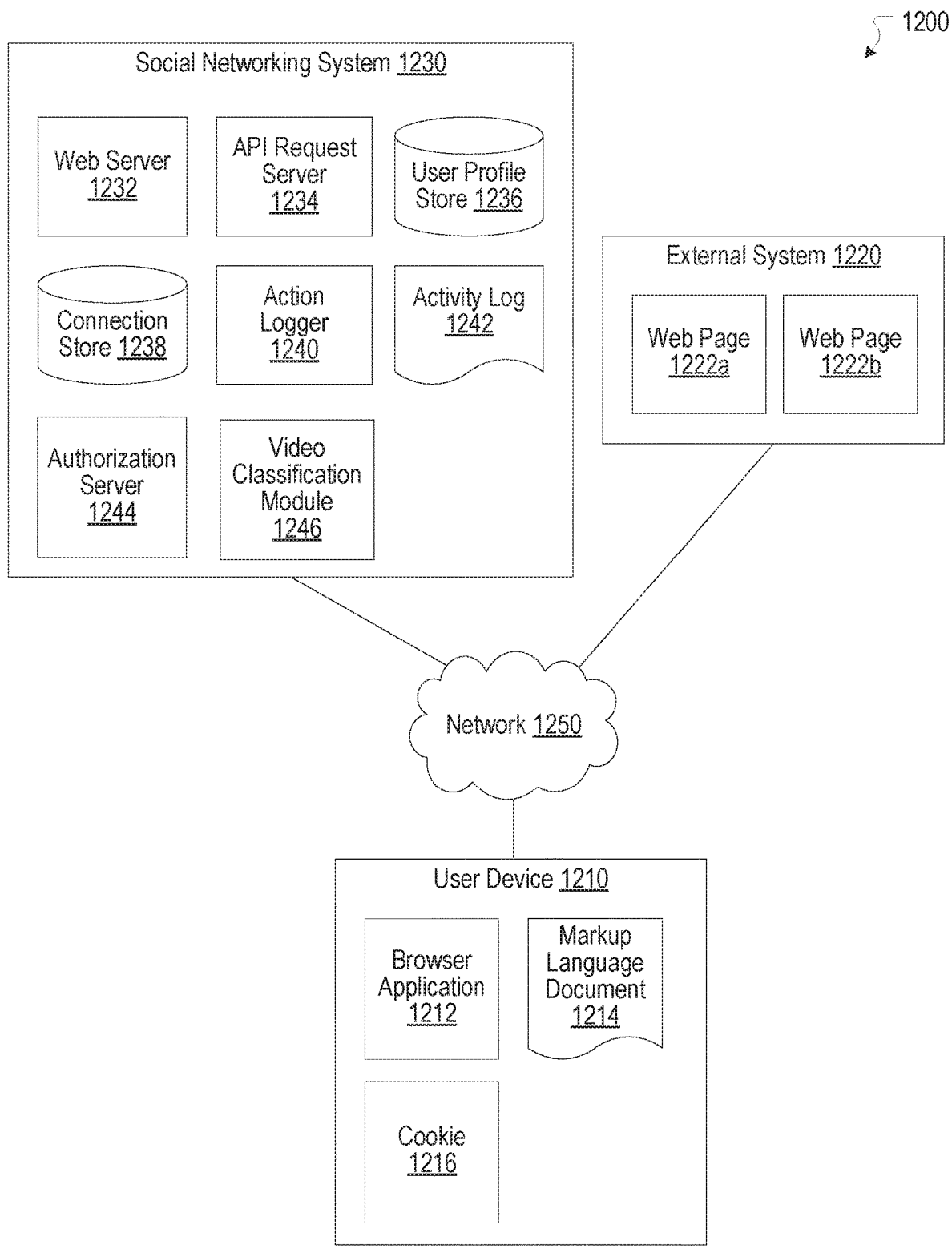
FIG. 12 illustrates a network diagram of an example system including an example social networking system that can be utilized in various scenarios, according to an embodiment of the present technology.

FIG. 12 illustrates a network diagram of an example system 1200 that can be utilized in various scenarios, according to an embodiment of the present technology. The system 1200 includes one or more user devices 1210, one or more external systems 1220, a social networking system (or service) 1230, and a network 1250. In an embodiment, the social networking service, provider, and/or system discussed in connection with the embodiments described above may be implemented as the social networking system 1230. For purposes of illustration, the embodiment of the system 1200, shown by FIG. 12, includes a single external system 1220 and a single user device 1210. However, in other embodiments, the system 1200 may include more user devices 1210 and/or more external systems 1220. In certain embodiments, the social networking system 1230 is operated by a social network provider, whereas the external systems 1220 are separate from the social networking system 1230 in that they may be operated by different entities. In various embodiments, however, the social networking system 1230 and the external systems 1220 operate in conjunction to provide social networking services to users (or members) of the social networking system 1230. In this sense, the social networking system 1230 provides a platform or backbone, which other systems, such as external systems 1220, may use to provide social networking services and functionalities to users across the Internet.

The user device 1210 comprises one or more computing devices that can receive input from a user and transmit and receive data via the network 1250. In one embodiment, the user device 1210 is a conventional computer system executing, for example, a Microsoft Windows compatible operating system (OS), Apple OS X, and/or a Linux distribution. In another embodiment, the user device 1210 can be a device having computer functionality, such as a smart-phone, a tablet, a personal digital assistant (PDA), a mobile telephone, etc. The user device 1210 is configured to communicate via the network 1250. The user device 1210 can execute an application, for example, a browser application that allows a user of the user device 1210 to interact with the social networking system 1230. In another embodiment, the user device 1210 interacts with the social networking system 1230 through an application programming interface (API) provided by the native operating system of the user device 1210, such as iOS and ANDROID. The user device 1210 is configured to communicate with the external system 1220 and the social networking system 1230 via the network 1250, which may comprise any combination of local area and/or wide area networks, using wired and/or wireless communication systems.

In one embodiment, the network 1250 uses standard communications technologies and protocols. Thus, the network 1250 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 1250 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 1250 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 1210 may display content from the external system 1220 and/or from the social networking system 1230 by processing a markup language document 1214 received from the external system 1220 and from the social networking system 1230 using a browser application 1212. The markup language document 1214 identifies content and one or more instructions describing formatting or presentation of the content. By executing the instructions included in the markup language document 1214, the browser application 1212 displays the identified content using the format or presentation described by the markup language document 1214. For example, the markup language document 1214 includes instructions for generating and displaying a web page having multiple frames that include text and/or image data retrieved from the external system 1220 and the social networking system 1230. In various embodiments, the markup language document 1214 comprises a data file including extensible markup language (XML) data, extensible hypertext markup language (XHTML) data, or other markup language data. Additionally, the markup language document 1214 may include JavaScript Object Notation (JSON) data, JSON with padding (JSONP), and JavaScript data to facilitate data-interchange between the external system 1220 and the user device 1210. The browser application 1212 on the user device 1210 may use a JavaScript compiler to decode the markup language document 1214.

The markup language document 1214 may also include, or link to, applications or application frameworks such as FLASH™ or Unity™ applications, the SilverLight™ application framework, etc.

In one embodiment, the user device 1210 also includes one or more cookies 1216 including data indicating whether a user of the user device 1210 is logged into the social networking system 1230, which may enable modification of the data communicated from the social networking system 1230 to the user device 1210.

The external system 1220 includes one or more web servers that include one or more web pages 1222a, 1222b, which are communicated to the user device 1210 using the network 1250. The external system 1220 is separate from the social networking system 1230. For example, the external system 1220 is associated with a first domain, while the social networking system 1230 is associated with a separate social networking domain. Web pages 1222a, 1222b, included in the external system 1220, comprise markup language documents 1214 identifying content and including instructions specifying formatting or presentation of the identified content.

The social networking system 1230 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 1230 may be administered, managed, or controlled by an operator. The operator of the social networking system 1230 may be a human being, an automated application, or a series of applications for managing content, regulating policies, and collecting usage metrics within the social networking system 1230. Any type of operator may be used.

Users may join the social networking system 1230 and then add connections to any number of other users of the social networking system 1230 to whom they desire to be connected. As used herein, the term "friend" refers to any other user of the social networking system 1230 to whom a user has formed a connection, association, or relationship via the social networking system 1230. For example, in an embodiment, if users in the social networking system 1230 are represented as nodes in the social graph, the term "friend" can refer to an edge formed between and directly connecting two user nodes.

Connections may be added explicitly by a user or may be automatically created by the social networking system 1230 based on common characteristics of the users (e.g., users who are alumni of the same educational institution). For example, a first user specifically selects a particular other user to be a friend. Connections in the social networking system 1230 are usually bilateral in both directions, but need not be, so the terms "user" and "friend" depend on the frame of reference. Connections between users of the social networking system 1230 are usually bilateral ("two-way"), or "mutual," but connections may also be unilateral, or "one-way." For example, if Bob and Joe are both users of the social networking system 1230 and connected to each other, Bob and Joe are each other's connections. If, on the other hand, Bob wishes to connect to Joe to view data communicated to the social networking system 1230 by Joe, but Joe does not wish to form a mutual connection, a unilateral connection may be established. The connection between users may be a direct connection; however, some embodiments of the social networking system 1230 allow the connection to be indirect via one or more levels of connections or degrees of separation.

In addition to establishing and maintaining connections between users and allowing interactions between users, the social networking system 1230 provides users with the ability to take actions on various types of items supported by the social networking system 1230. These items may include groups or networks (i.e., social networks of people, entities, and concepts) to which users of the social networking system 1230 may belong, events or calendar entries in which a user might be interested, computer-based applications that a user may use via the social networking system 1230, transactions that allow users to buy or sell items via services provided by or through the social networking system 1230, and interactions with advertisements that a user may perform on or off the social networking system 1230. These are just a few examples of the items upon which a user may act on the social networking system 1230, and many others are possible. A user may interact with anything that is capable of being represented in the social networking system 1230 or in the external system 1220, separate from the social networking system 1230, or coupled to the social networking system 1230 via the network 1250.

The social networking system 1230 is also capable of linking a variety of entities. For example, the social networking system 1230 enables users to interact with each other as well as external systems 1220 or other entities through an API, a web service, or other communication channels. The social networking system 1230 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 1230. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 1230 modifies edges connecting the various nodes to reflect the relationships and interactions.

The social networking system 1230 also includes user-generated content, which enhances a user's interactions with the social networking system 1230. User-generated content may include anything a user can add, upload, send, or "post" to the social networking system 1230. For example, a user communicates posts to the social networking system 1230 from a user device 1210. Posts may include data such as status updates or other textual data, location information, images such as photos, videos, links, music or other similar data and/or media. Content may also be added to the social networking system 1230 by a third party. Content "items" are represented as objects in the social networking system 1230. In this way, users of the social networking system 1230 are encouraged to communicate with each other by posting text and content items of various types of media through various communication channels. Such communication increases the interaction of users with each other and increases the frequency with which users interact with the social networking system 1230.

The social networking system 1230 includes a web server 1232, an API request server 1234, a user profile store 1236, a connection store 1238, an action logger 1240, an activity log 1242, and an authorization server 1244. In an embodiment of the invention, the social networking system 1230 may include additional, fewer, or different components for various applications. Other components, such as network interfaces, security mechanisms, load balancers, failover servers, management and network operations consoles, and the like are not shown so as to not obscure the details of the system.

The user profile store 1236 maintains information about user accounts, including biographic, demographic, and other types of descriptive information, such as work experience, educational history, hobbies or preferences, location, and the like that has been declared by users or inferred by the social networking system 1230. This information is stored in the user profile store 1236 such that each user is uniquely identified. The social networking system 1230 also stores data describing one or more connections between different users in the connection store 1238. The connection information may indicate users who have similar or common work experience, group memberships, hobbies, or educational history. Additionally, the social networking system 1230 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 1230, such as non-person entities, buckets, cluster centers, images, interests, pages, external systems, concepts, and the like are also stored in the connection store 1238.

The social networking system 1230 maintains data about objects with which a user may interact. To maintain this data, the user profile store 1236 and the connection store 1238 store instances of the corresponding type of objects maintained by the social networking system 1230. Each object type has information fields that are suitable for storing information appropriate to the type of object. For example, the user profile store 1236 contains data structures with fields suitable for describing a user's account and information related to a user's account. When a new object of a particular type is created, the social networking system 1230 initializes a new data structure of the corresponding type, assigns a unique object identifier to it, and begins to add data to the object as needed. This might occur, for example, when a user becomes a user of the social networking system 1230, the social networking system 1230 generates a new instance of a user profile in the user profile store 1236, assigns a unique identifier to the user account, and begins to populate the fields of the user account with information provided by the user.

The connection store 1238 includes data structures suitable for describing a user's connections to other users, connections to external systems 1220 or connections to other entities. The connection store 1238 may also associate a connection type with a user's connections, which may be used in conjunction with the user's privacy setting to regulate access to information about the user. In an embodiment of the invention, the user profile store 1236 and the connection store 1238 may be implemented as a federated database.

Data stored in the connection store 1238, the user profile store 1236, and the activity log 1242 enables the social networking system 1230 to generate the social graph that uses nodes to identify various objects and edges connecting nodes to identify relationships between different objects. For example, if a first user establishes a connection with a second user in the social networking system 1230, user accounts of the first user and the second user from the user profile store 1236 may act as nodes in the social graph. The connection between the first user and the second user stored by the connection store 1238 is an edge between the nodes associated with the first user and the second user. Continuing this example, the second user may then send the first user a message within the social networking system 1230. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 1230 (or, alternatively, in an image maintained by another system outside of the social networking system 1230). The image may itself be represented as a node in the social networking system 1230. This tagging action may create edges between the first user and the second user as well as create an edge between each of the users and the image, which is also a node in the social graph. In yet another example, if a user confirms attending an event, the user and the event are nodes obtained from the user profile store 1236, where the attendance of the event is an edge between the nodes that may be retrieved from the activity log 1242. By generating and maintaining the social graph, the social networking system 1230 includes data describing many different types of objects and the interactions and connections among those objects, providing a rich source of socially relevant information.

The web server 1232 links the social networking system 1230 to one or more user devices 1210 and/or one or more external systems 1220 via the network 1250. The web server 1232 serves web pages, as well as other web-related content, such as Java, JavaScript, Flash, XML, and so forth. The web server 1232 may include a mail server or other messaging functionality for receiving and routing messages between the social networking system 1230 and one or more user devices 1210. The messages can be instant messages, queued messages (e.g., email), text and SMS messages, or any other suitable messaging format.

The API request server 1234 allows one or more external systems 1220 and user devices 1210 to call access information from the social networking system 1230 by calling one or more API functions. The API request server 1234 may also allow external systems 1220 to send information to the social networking system 1230 by calling APIs. The external system 1220, in one embodiment, sends an API request to the social networking system 1230 via the network 1250, and the API request server 1234 receives the API request. The API request server 1234 processes the request by calling an API associated with the API request to generate an appropriate response, which the API request server 1234 communicates to the external system 1220 via the network 1250. For example, responsive to an API request, the API request server 1234 collects data associated with a user, such as the user's connections that have logged into the external system 1220, and communicates the collected data to the external system 1220. In another embodiment, the user device 1210 communicates with the social networking system 1230 via APIs in the same manner as external systems 1220.

The action logger 1240 is capable of receiving communications from the web server 1232 about user actions on and/or off the social networking system 1230. The action logger 1240 populates the activity log 1242 with information about user actions, enabling the social networking system 1230 to discover various actions taken by its users within the social networking system 1230 and outside of the social networking system 1230. Any action that a particular user takes with respect to another node on the social networking system 1230 may be associated with each user's account, through information maintained in the activity log 1242 or in a similar database or other data repository. Examples of actions taken by a user within the social networking system 1230 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 1230, the action is recorded in the activity log 1242. In one embodiment, the social networking system 1230 maintains the activity log 1242 as a database of entries. When an action is taken within the social networking system 1230, an entry for the action is added to the activity log 1242. The activity log 1242 may be referred to as an action log.

Additionally, user actions may be associated with concepts and actions that occur within an entity outside of the social networking system 1230, such as an external system 1220 that is separate from the social networking system 1230. For example, the action logger 1240 may receive data describing a user's interaction with an external system 1220 from the web server 1232. In this example, the external system 1220 reports a user's interaction according to structured actions and objects in the social graph.

Other examples of actions where a user interacts with an external system 1220 include a user expressing an interest in an external system 1220 or another entity, a user posting a comment to the social networking system 1230 that discusses an external system 1220 or a web page 1222*a* within the external system 1220, a user posting to the social networking system 1230 a Uniform Resource Locator (URL) or other identifier associated with an external system 1220, a user attending an event associated with an external system 1220, or any other action by a user that is related to an external system 1220. Thus, the activity log 1242 may include actions describing interactions between a user of the social networking system 1230 and an external system 1220 that is separate from the social networking system 1230.

The authorization server 1244 enforces one or more privacy settings of the users of the social networking system 1230. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 1220, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 1220. One embodiment allows the specification of the set of entities to comprise an enumeration of entities. For example, the user may provide a list of external systems 1220 that are allowed to access certain information. Another embodiment allows the specification to comprise a set of entities along with exceptions that are not allowed to access the information. For example, a user may allow all external systems 1220 to access the user's work information, but specify a list of external systems 1220 that are not allowed to access the work information. Certain embodiments call the list of exceptions that are not allowed to access certain information a "block list". External systems 1220 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 1244 contains logic to determine if certain information associated with a user can be accessed by a user's friends, external systems 1220, and/or other applications and entities. The external system 1220 may need authorization from the authorization server 1244 to access the user's more private and sensitive information, such as the user's work phone number. Based on the user's privacy settings, the authorization server 1244 determines if another user, the external system 1220, an application, or another entity is allowed to access information associated with the user, including information about actions taken by the user.

In some embodiments, the social networking system 1230 can include a video classification module 1246. The video classification module 1246 can, for example, be implemented as the video classification module 102, as discussed in more detail herein. In some embodiments, one or more functionalities of the video classification module 1246 can be implemented in the user device 1210. As discussed previously, it should be appreciated that there can be many variations or other possibilities.

Hardware Implementation

Figure 13:
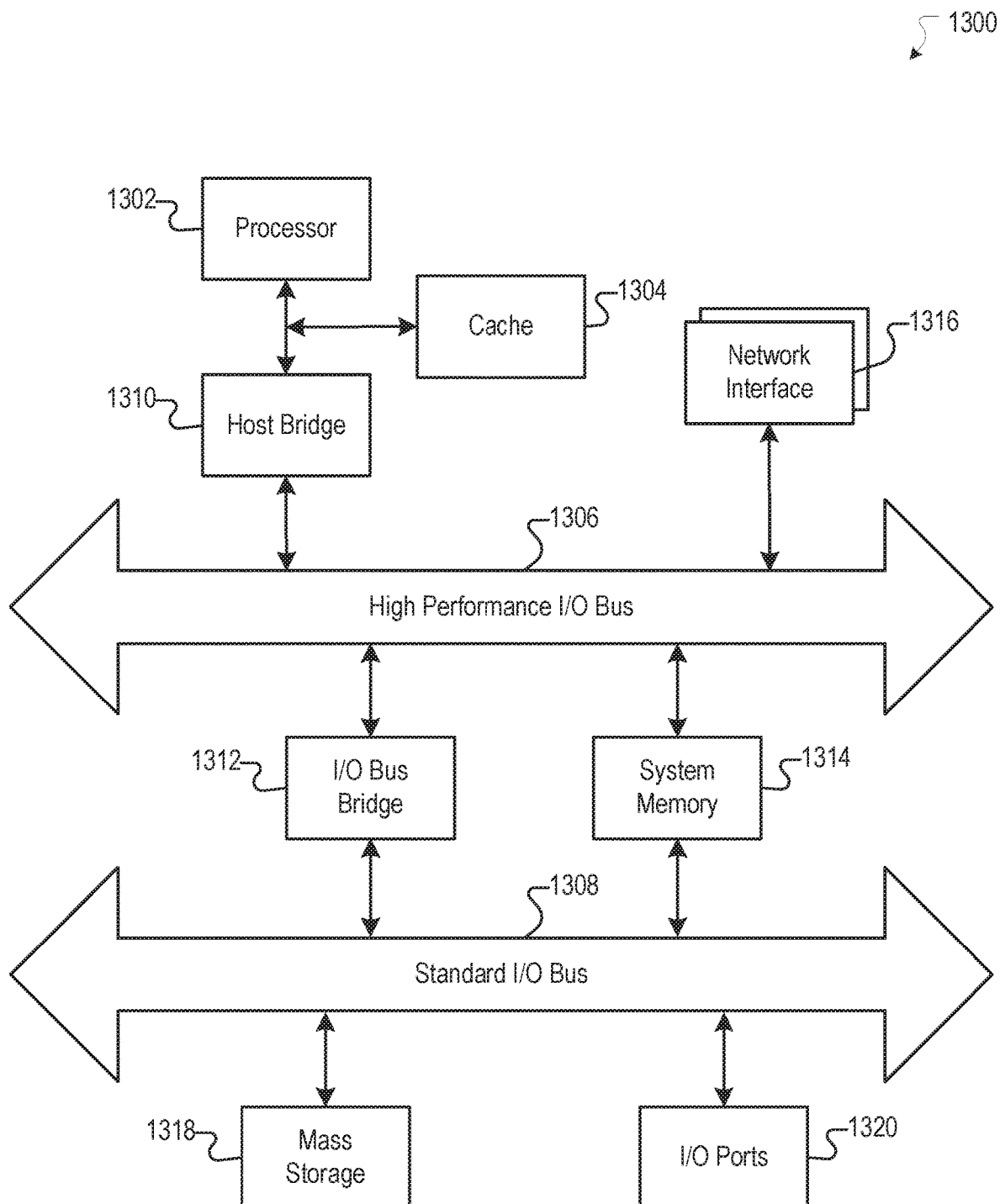
FIG. 13 illustrates an example of a computer system or computing device that can be utilized in various scenarios, according to an embodiment of the present technology.

The foregoing processes and features can be implemented by a wide variety of machine and computer system architectures and in a wide variety of network and computing environments. FIG. 13 illustrates an example of a computer system 1300 that may be used to implement one or more of the embodiments described herein according to an embodiment of the invention. The computer system 1300 includes sets of instructions for causing the computer system 1300 to perform the processes and features discussed herein. The computer system 1300 may be connected (e.g., networked) to other machines. In a networked deployment, the computer system 1300 may operate in the capacity of a server machine or a client machine in a client-server network environment, or as a peer machine in a peer-to-peer (or distributed) network environment. In an embodiment of the invention, the computer system 1300 may be the social networking system 1230, the user device 1210, and the external system 1220, or a component thereof. In an embodiment of the invention, the computer system 1300 may be one server among many that constitutes all or part of the social networking system 1230.

The computer system 1300 includes a processor 1302, a cache 1304, and one or more executable modules and drivers, stored on a computer-readable medium, directed to the processes and features described herein. Additionally, the computer system 1300 includes a high performance input/output (I/O) bus 1306 and a standard I/O bus 1308. A host bridge 1310 couples processor 1302 to high performance I/O bus 1306, whereas I/O bus bridge 1312 couples the two buses 1306 and 1308 to each other. A system memory 1314 and one or more network interfaces 1316 couple to high performance I/O bus 1306. The computer system 1300 may further include video memory and a display device coupled to the video memory (not shown). Mass storage 1318 and I/O ports 1320 couple to the standard I/O bus 1308. The computer system 1300 may optionally include a keyboard and pointing device, a display device, or other input/output devices (not shown) coupled to the standard I/O bus 1308. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 1300, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 1300 are described in greater detail below. In particular, the network interface 1316 provides communication between the computer system 1300 and any of a wide range of networks, such as an Ethernet (e.g., IEEE 802.3) network, a backplane, etc. The mass storage 1318 provides permanent storage for the data and programming instructions to perform the above-described processes and features implemented by the respective computing systems identified above, whereas the system memory 1314 (e.g., DRAM) provides temporary storage for the data and programming instructions when executed by the processor 1302. The I/O ports 1320 may be one or more serial and/or parallel communication ports that provide communication between additional peripheral devices, which may be coupled to the computer system 1300.

The computer system 1300 may include a variety of system architectures, and various components of the computer system 1300 may be rearranged. For example, the cache 1304 may be on-chip with processor 1302. Alternatively, the cache 1304 and the processor 1302 may be packed together as a "processor module", with processor 1302 being referred to as the "processor core". Furthermore, certain embodiments of the invention may neither require nor include all of the above components. For example, peripheral devices coupled to the standard I/O bus 1308 may couple to the high performance I/O bus 1306. In addition, in some embodiments, only a single bus may exist, with the components of the computer system 1300 being coupled to the single bus. Moreover, the computer system 1300 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 1300 that, when read and executed by one or more processors, cause the computer system 1300 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 1300, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 1302. Initially, the series of instructions may be stored on a storage device, such as the mass storage 1318. However, the series of instructions can be stored on any suitable computer readable storage medium. Furthermore, the series of instructions need not be stored locally, and could be received from a remote storage device, such as a server on a network, via the network interface 1316. The instructions are copied from the storage device, such as the mass storage 1318, into the system memory 1314 and then accessed and executed by the processor 1302. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 1300 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
   receiving, by a computing system, a set of video frames associated with a video;
   determining, by the computing system, that a threshold number of video frames of the set of video frames includes two or more reaction icons, wherein at least one video frame of the set of video frames includes a prompt to select at least one reaction icon of the two or more reaction icons; and
   identifying, by the computing system, the video as a poll video based on the determining that the threshold number of video frames of the set of video frames includes the two or more reaction icons.

2. The computer-implemented method of claim 1, wherein each reaction icon of the two or more reaction icons is associated with one or more colors, and the one or more colors associated with each reaction icon collectively define a set of colors associated with the two or more reaction icons.

3. The computer-implemented method of claim 2, wherein the determining that the threshold number of video frames of the set of video frames includes the two or more reaction icons comprises: filtering each video frame of the set of video frames based on the set of colors to define a set of color-filtered video frames.

4. The computer-implemented method of claim 2, wherein the set of colors associated with the two or more reaction icons comprises a plurality of ranges of RGB values.

5. The computer-implemented method of claim 1, wherein the determining that the threshold number of video frames of the set of video frames includes the two or more reaction icons further comprises: identifying any circles depicted in each video frame of the set of video frames.

6. The computer-implemented method of claim 5, wherein the identifying any circles depicted in each video frame of the set of video frames comprises identifying any circles depicted in each video frame of the set of video frames based on Hough transforms.

7. The computer-implemented method of claim 5, wherein the determining that the threshold number of video frames of the set of video frames includes the two or more reaction icons further comprises: determining, for each circle identified in the set of video frames, whether the circle includes a reaction icon of the two or more reaction icons.

8. The computer-implemented method of claim 7, wherein the determining, for each circle identified in the set of video frames, whether the circle includes the reaction icon of the two or more reaction icons comprises determining whether the circle includes the reaction icon of the two or more reaction icons based on shape context feature descriptors.

9. The computer-implemented method of claim 1, wherein the two or more reaction icons are two or more reaction icons provided by a social networking system for responding to content items posted to the social networking system.

10. The computer-implemented method of claim 9, wherein the video is a video posted to the social networking system.

11. A system comprising:
    at least one processor; and
    a memory storing instructions that, when executed by the at least one processor, cause the system to perform a method comprising:
      receiving a set of video frames associated with a video;
      determining that a threshold number of video frames of the set of video frames includes two or more reaction icons, wherein at least one video frame of the set of video frames includes a prompt to select at least one reaction icon of the two or more reaction icons; and
      identifying the video as a poll video based on the determining that the threshold number of video frames of the set of video frames includes the two or more reaction icons.

12. The system of claim 11, wherein each reaction icon of the two or more reaction icons is associated with one or more colors, and the one or more colors associated with each reaction icon collectively define a set of colors associated with the two or more reaction icons.

13. The system of claim 12, wherein the determining that the threshold number of video frames of the set of video frames includes the two or more reaction icons comprises: filtering each video frame of the set of video frames based on the set of colors to define a set of color-filtered video frames.

14. The system of claim 12, wherein the set of colors associated with the two or more reaction icons comprises a plurality of ranges of RGB values.

15. The system of claim 11, wherein the determining that the threshold number of video frames of the set of video frames includes the two or more reaction icons further comprises: identifying any circles depicted in each video frame of the set of video frames.

16. A non-transitory computer-readable storage medium including instructions that, when executed by at least one processor of a computing system, cause the computing system to perform a method comprising:
receiving a set of video frames associated with a video;
determining that a threshold number of video frames of the set of video frames includes two or more reaction icons, wherein at least one video frame of the set of video frames includes a prompt to select at least one reaction icon of the two or more reaction icons; and
identifying the video as a poll video based on the determining that the threshold number of video frames of the set of video frames includes the two or more reaction icons.

17. The non-transitory computer-readable storage medium of claim 16, wherein each reaction icon of the two or more reaction icons is associated with one or more colors, and the one or more colors associated with each reaction icon collectively define a set of colors associated with the two or more reaction icons.

18. The non-transitory computer-readable storage medium of claim 17, wherein the determining that the threshold number of video frames of the set of video frames includes the two or more reaction icons comprises: filtering each video frame of the set of video frames based on the set of colors to define a set of color-filtered video frames.

19. The non-transitory computer-readable storage medium of claim 17, wherein the set of colors associated with the two or more reaction icons comprises a plurality of ranges of RGB values.

20. The non-transitory computer-readable storage medium of claim 16, wherein the determining that the threshold number of video frames of the set of video frames includes the two or more reaction icons further comprises: identifying any circles depicted in each video frame of the set of video frames.

* * * * *